(12) United States Patent
Jadanovski et al.

(10) Patent No.: US 7,693,893 B2
(45) Date of Patent: Apr. 6, 2010

(54) DISTRIBUTED HANDLING OF ASSOCIATED DATA SETS IN A COMPUTER NETWORK

(75) Inventors: Andrei Jadanovski, Schwaebisch Hall (DE); Johann Kemmer, Muehlhausen (DE); Robert Reiner, Sandhausen (DE); Paola Sala, Heidelberg (DE); Elena Gurevich, Sandhausen (DE)

(73) Assignee: SAP AG, Walldorf (DE)

( * ) Notice: Subject to any disclaimer, the term of this patent is extended or adjusted under 35 U.S.C. 154(b) by 552 days.

(21) Appl. No.: 10/949,331

(22) Filed: Sep. 27, 2004

(65) Prior Publication Data

US 2005/0086291 A1 Apr. 21, 2005

Related U.S. Application Data

(60) Provisional application No. 60/510,472, filed on Oct. 10, 2003.

(51) Int. Cl.
*G06F 7/00* (2006.01)

(52) U.S. Cl. .............. 707/705; 707/758; 707/802; 705/26; 705/27; 705/28

(58) Field of Classification Search .................. None
See application file for complete search history.

(56) References Cited

U.S. PATENT DOCUMENTS

| | | | | |
|---|---|---|---|---|
| 5,960,411 | A * | 9/1999 | Hartman et al. ............ 705/26 |
| 6,154,738 | A * | 11/2000 | Call ........................... 707/4 |
| 6,199,079 | B1 * | 3/2001 | Gupta et al. ............. 715/507 |
| 6,629,079 | B1 * | 9/2003 | Spiegel et al. ............ 705/26 |
| 6,963,849 | B1 * | 11/2005 | Chaturvedi et al. ......... 705/10 |
| 6,980,966 | B1 * | 12/2005 | Sobrado et al. ............ 705/26 |
| 7,047,228 | B1 * | 5/2006 | Murphy ..................... 707/1 |
| 7,346,562 | B2 * | 3/2008 | Inoue et al. ............... 705/27 |
| 2002/0087408 | A1 * | 7/2002 | Burnett ..................... 705/14 |
| 2002/0120483 | A1 | 8/2002 | Chen |
| 2002/0194194 | A1 * | 12/2002 | Fenton et al. ........... 707/104.1 |
| 2002/0198829 | A1 * | 12/2002 | Ludwig et al. ............ 705/40 |

(Continued)

FOREIGN PATENT DOCUMENTS

EP 0 510 908 A2 10/1992

(Continued)

*Primary Examiner*—Tim T. Vo
*Assistant Examiner*—Hasanul Mobin
(74) *Attorney, Agent, or Firm*—Finnegan, Henderson, Farabow, Garrett & Dunner LLP

(57) ABSTRACT

A networked database includes the automatic creation of follow-on data sets from initial data sets. A dialogue routine is implemented for initiating a dialogue-type communication that includes inputting and confirming data required for creating the follow-on data sets. The database is provided with a plurality of data sets and is capable of generating and displaying a list of data sets according to user-defined criteria. For a data set in the generated list that allows for the automatic creation of a follow-on data set, a related, configurable, user-activated control element is displayed. Upon user-activation, the control element, generates a control signal for initiating the automatic creation of the follow-on data set based on data derived from the selected data set and/or any data set associated with the selected data set. The newly created follow-on data set is then associated with the selected data set.

29 Claims, 11 Drawing Sheets

U.S. PATENT DOCUMENTS

| | | | |
|---|---|---|---|
| 2004/0019515 A1* | 1/2004 | Senyurt | 705/9 |
| 2004/0153332 A1* | 8/2004 | Libuit et al. | 705/26 |
| 2004/0172360 A1* | 9/2004 | Mabrey et al. | 705/40 |
| 2005/0027611 A1* | 2/2005 | Wharton | 705/26 |

FOREIGN PATENT DOCUMENTS

| | | |
|---|---|---|
| EP | 0 903 678 A2 | 3/1999 |
| EP | 1 267 277 A1 | 12/2002 |
| EP | 1 280 053 A1 | 1/2003 |
| WO | WO 94/29804 | 12/1994 |
| WO | WO 01/77955 A1 | 10/2001 |

\* cited by examiner

DISTRIBUTED HANDLING OF ASSOCIATED DATA SETS IN A COMPUTER NETWORK

CROSS-REFERENCE TO RELATED APPLICATIONS

This application claims the benefit of priority from U.S. Provisional Patent Application No. 60/510,472, filed on Oct. 10, 2003, and entitled "Distributed Handling of Associated Data Sets in a Computer Network," which is fully incorporated herein by reference for all purposes.

BACKGROUND OF THE INVENTION

1. Field of the Invention

The invention relates to the distributed handling of associated data sets in a computer network. More specifically, the invention relates to creating one or more follow-on data sets for an initial data set.

2. Description of Related Art

Modern database related processes, i.e., processes that are based on repeatedly accessing one or more databases, commonly involve transitions between multiple processing stages. Transitions from one processing stage to another are often accompanied by the generation of data specific for a particular transition and indicative of the current processing stage (i.e., the processing stage from which the transition is occurring). Conventionally, the transition from one processing stage to another is initiated by dialogue-type communications during which data required for creating a particular follow-on data set is input, verified and confirmed.

As an example of such database-related processes, consider the computer-assisted procurement of goods and services or the computer-assisted manufacturing of complex machinery. During a procurement process, data pertaining to different processing stages, like purchase requisition, goods ordering, goods receiving and invoicing, are successively generated and have to be successively stored. Hence, individual data sets associated with the individual processing stages will have to be handled as the procurement process proceeds.

Due to the very nature of processes of the above type, generation of a data set during a particular processing stage usually requires the evaluation of data sets that have been generated earlier during one or more preceding processing stages. Thus, from the point of view of an initial data set that has been created during an earlier processing stage, in later processing stages follow-on data sets somehow associated with the initial data set are generated.

Since complex database related processes necessitate the interaction of a plurality of users, software mechanisms handling the generation, storage and manipulation of process-related data sets usually run on distributed components of a computer network. This requirement implies that individual data sets can be accessed from different network components at different processing stages.

When a user is accessing or manipulating a particular data set, this data set will usually be locked for other users to ensure a high data integrity. This means that the other users will experience an access delay, which depending on the specific situation can last from a few seconds to several hours. Such access delays are particularly disruptive in scenarios of the above type where follow-on data sets have to be created from an initial data set. The reason for this is that the access delays may additionally prevent a smooth transition to from one processing stage to another processing stage.

Although annoying, access delays and consecutive processing stage transition delays might be tolerated in scenarios that involve only a few collaborative users, a few processing stages and/or a small number of processes running in parallel. In such scenarios mutual communication between the few users, for example, by telephone or via e-mail can resolve potential conflicts and ensure a smooth and rapid transition from one processing stage to another. However, with increasing numbers of collaborative users, increasing numbers of parallel processes and/or increasing process stage complexity, such conventional conflict resolution mechanisms can no longer be employed.

Consequently, what is needed is efficient handling of associated data sets stored within one or more databases to enable automatic and standardized processing of large amounts of the associated data sets for accelerated creation of follow-on data sets.

SUMMARY OF THE INVENTION

According one aspect of the invention, a method is provided for handling data sets in a computer network by automatically creating, for a data set, at least one associated follow-on data set, wherein the data sets may be directly or indirectly accessible from a plurality of network components and wherein a dialogue routine is implemented for initiating one or more dialogue-type communications that include at least one of inputting and confirming data required for creating the follow-on data set. The method comprises the steps of providing a database with a plurality of data sets, generating a list of data sets according to one or more user-defined criteria, and displaying the list at least partially, wherein one or more data sets of the list allow for the automatic creation of a follow-on data set. Upon selection of an individual data set that allows for the automatic creation of a follow-on data set, the dialogue routine is skipped for the follow-on data set to be created, the follow-on data set for the selected data set is automatically created on the basis of data automatically derived from at least one of the selected data set and any data set associated with the selected data set, and the newly created follow-on data set is associated with the selected data set. Selection of a particular data set that allows for the automatic creation of a follow-on data set may be implemented by displaying a first control element related to a displayed data set that allows for the automatic creation of a follow-on data set. The first control element may be configured to be activated by a user-operated input device like a mouse or a keyboard to generate a first control signal for initiating the automatic creation of a follow-on data set for the data set selected by activating the related first control element. Upon creation of the first control signal, the follow-on data set is automatically created.

The method may be performed in a scenario that is based on a single follow-on data set type or in a scenario that involves a plurality of different follow-on data set types. The latter scenario may include a process that comprises several consecutive processing stages. Each processing stage may be associated with a particular follow-on data set type, so that as the process proceeds, two or more follow-on data sets are consecutively created.

As has been mentioned above, the list of data sets is generated according to one or more user-defined criteria. Thus, the method may further include the input of one or more selection criteria that are to be considered when generating the list of data sets. The selection criteria may be related to various aspects of the data sets such as the creation date, a particular data set status, a specific user or user group in charge of handling the data set, etc.

In the case two or more different follow-on data set types are defined, the selection criteria may additionally or alternatively include a particular follow-on data set type. Upon selection of a particular follow-on data set type, the list of data sets may thus be generated from data sets that allow for a creation of follow-on data sets of the selected type. Selection of a particular follow-on data set type may be performed in various ways. According to one exemplary implementation, selection of a follow-on data set type is enabled by displaying a list of two or more follow-on data set types and by relating a second control element to each type, the second control element being configured to be activated by a user-operated input device to generate a second control signal indicative of the selected type. The second control signal may be evaluated prior to generating the list of data sets. Hence, the list of data sets may selectively include only data sets that allow for the creation of a follow-on data set of a particular type.

In a scenario that includes a plurality of different follow-on data set types, for each follow-on data set type an individual type of first control element may be defined. In a further step an individual data set (e.g., of the list of data sets) may be assessed to find out if a follow-on data set can be created for this particular data set and to determine the type of follow-on data set that can be created for this particular data set. Thus, a data set for which a follow-on data set of a specific type can be created may be displayed together with the corresponding type of first control element. In such a case display of the first control element not only informs the user about the fact that a follow-on data set can be created but additionally informs the user of the particular type of follow-on data set that can be created for the displayed data set.

The list of data sets may only include data sets for which a non-specified or a previously selected follow-on data set can automatically be created skipping the implemented dialogue routine. According to a further variant of the invention, the list of data sets may also include data sets for which an associated follow-on data set can only be created using the dialogue routine. For such data sets necessitating dialogue-typed interactions no related first control elements may be displayed or, if displayed, may be configured as non-active.

The individual data sets stored in the database can have various formats. According to one exemplary data set format, each data set includes a header with individual data set information like a data set denomination or a time stamp (e.g., creation date). Additionally, a data set may include one, two or more individual data items following the data set header. According to one variant of the invention, follow-on data sets may be created for the individual data items of a data set. In such a case two or more follow-on data sets of the same follow-on data set type may be created independently for a single data set. For each independently created follow-on data set one or more further follow-on data sets may be created. Thus, a single individual data set may form the root of a tree that includes leafs and/or knots in the form of associated follow-on data sets. Each knot may in turn have one, two or more sons.

If a data set is comprised of one or more individual data items, the list of data sets may be generated from data sets that include at least one data item that allows for a creation of a follow-on data set. For each individual data item that allows for a creation of a follow-on data set an individual first control element may be provided.

The first control element related to a data set that allows for the automatic creation of a follow-on data set may be displayed in an overview screen on which the list of data sets is presented also. Presentation of the list of data sets can be performed for example by displaying for each data set belonging to the list characteristic information like a data set denomination derived from the data set header.

A third control element may be related to each displayed data set of the list of data sets. The third control element may be configured to be activated by a user-operated input device to generate a third/control signal. Generation of the third control signal may result in additional information about the data set selected by activating a particular third control element being displayed. Additionally, generation of the third control signal may result in a display of the first control element for the selected data set. Thus, the first control element may remain invisible until generation of the third control signal. This means that the third control signal may precede a related first control signal.

Upon generation of the first control signal, at least one of the selected data set and any data set associated therewith may be locked at least partially with respect to changing data comprised therein. Such a mechanism prevents that the particular user having created the first control signal or any third user can interfere with the background process of automatically creating a follow-on data set.

Creation of a follow-on data set for a selected data set may require the processing of particular data. This data may for example be input in the course of the dialogue routine. If the dialogue routine is skipped, the data required for creating a follow-on data set may be automatically derived by assessing at least one of the selected data set for which the follow-on data set will be created and any data set associated with the selected data set. This may include that the selected data set and/or any associated data set are evaluated to determine if the available information suffices for automatically creating a follow-on data set.

The data required for creating a particular follow-on data set may be derived in various ways and at various points in time. The required data may for example be derived by comparing an initially specified numerical value with an accumulated numerical value that has been generated from individual numerical values input, confirmed or derived in context with the creation of at least one of the selected data set and any associated data set. The difference between the initially specified numerical value and the accumulated numerical value may form the basis for creating the follow-on data set.

Once the follow-on data set has been created, it may be associated with the selected data set for which it has been created. To this end a link between the newly created follow-on data set and the selected data set may be established for example by writing information relating to the newly created follow-on data set in a memory location of the selected data set or any data set associated with the selected data set. Alternatively or additionally, information about the selected data set or any data set associated therewith may be written in a memory location the newly created follow-on data set.

Information included in the newly created follow-on data set may be used to control a printing device arranged in the network to generate a document like a goods receipt or an invoice. A further possibility is to send the newly created follow-on data set or information included therein via e-mail or in any other electronic form to a remote network component.

The present invention may be implemented as software, as a piece of hardware, or as a combination thereof. Thus, the invention also relates to a computer program product with program code portions for performing the individual steps of the invention when the computer program is run on one or more network components. The computer program product may include a first program code portion for searching a database for data sets according to one or more users defined criteria and for generating a data set list thereof, and a second program code portion for displaying the data set list at least partially. For a data set of the list that allows for the automatic creation of a follow-on data set a related control element may be displayed, the control element being configured to be activated by a user-operated input device to generate a control signal for initiating the automatic creation of a follow-on data set for the data set selected by activating a related control element. The computer program product may further comprise a third program code portion responsive to generation of the control signal, for skipping a dialogue routine for the follow-on data set to be created, for automatically creating the follow-on data set on the basis of automatically derived data, and for associating the newly created follow-on data set with the selected data set.

According to a further (hardware) aspect of the invention, a network component is provided that belongs to a computer network including a database with a plurality of data sets and several network components having access to the database. The network component comprises a first interface for providing an access to the database, a processor for generating an instruction for searching the database for data sets according to one or more user-defined criteria and for generating a list thereof, and a second interface to a presentation unit that displays the generated list at least partially. The list may include at least one data set that allows for the automatic creation of a follow-on data set. A control element related to the data set that allows for the automatic creation of a follow-on data set may be displayed and configured to be activated by a user-operated input device to generate a control signal for initiating the automatic creation of a follow-on data set for the data set selected by activating the related control element. Upon receipt of the control signal via the second interface, the processor skips a dialogue routine implemented for inputting data required to create a follow-on data set, automatically creates the follow-on data set on the basis of previously derived data, and associates the selected data set with the newly created follow-on data set.

The network component may for example be configured as an application server that communicates with further network components according to the hypertext transfer protocol (HTTP). The further network components communicating with the application server may include one or more database servers on which the database is installed and one or more presentation servers functioning as presentation units.

BRIEF DESCRIPTION OF THE DRAWINGS

Further aspects, features, details, embodiments, modifications and enhancements of the invention may be obtained from consideration of the following detailed description of various illustrative embodiments of the invention in conjunction with the accompanying drawings, wherein.

DETAILED DESCRIPTION OF PREFERRED EMBODIMENTS

The present invention will now be described in detail with reference to the drawings, which are provided as illustrative examples of the invention so as to help enable those skilled in the art to practice the invention. Notably, the figures and examples below are not meant to limit the scope of the present invention. Where appropriate, the same reference numbers will be used throughout this detailed description in conjunction with the drawings to refer to the same or like parts. Where certain elements of the present invention can be partially or fully implemented using known components, only portions of such known components that are necessary for an understanding of the present invention will be described in detail, while other portions of such known components will be omitted so as not to obscure the invention. Further, the present invention encompasses present and future known equivalents to the components referred to herein by way of illustration.

Figure 1:
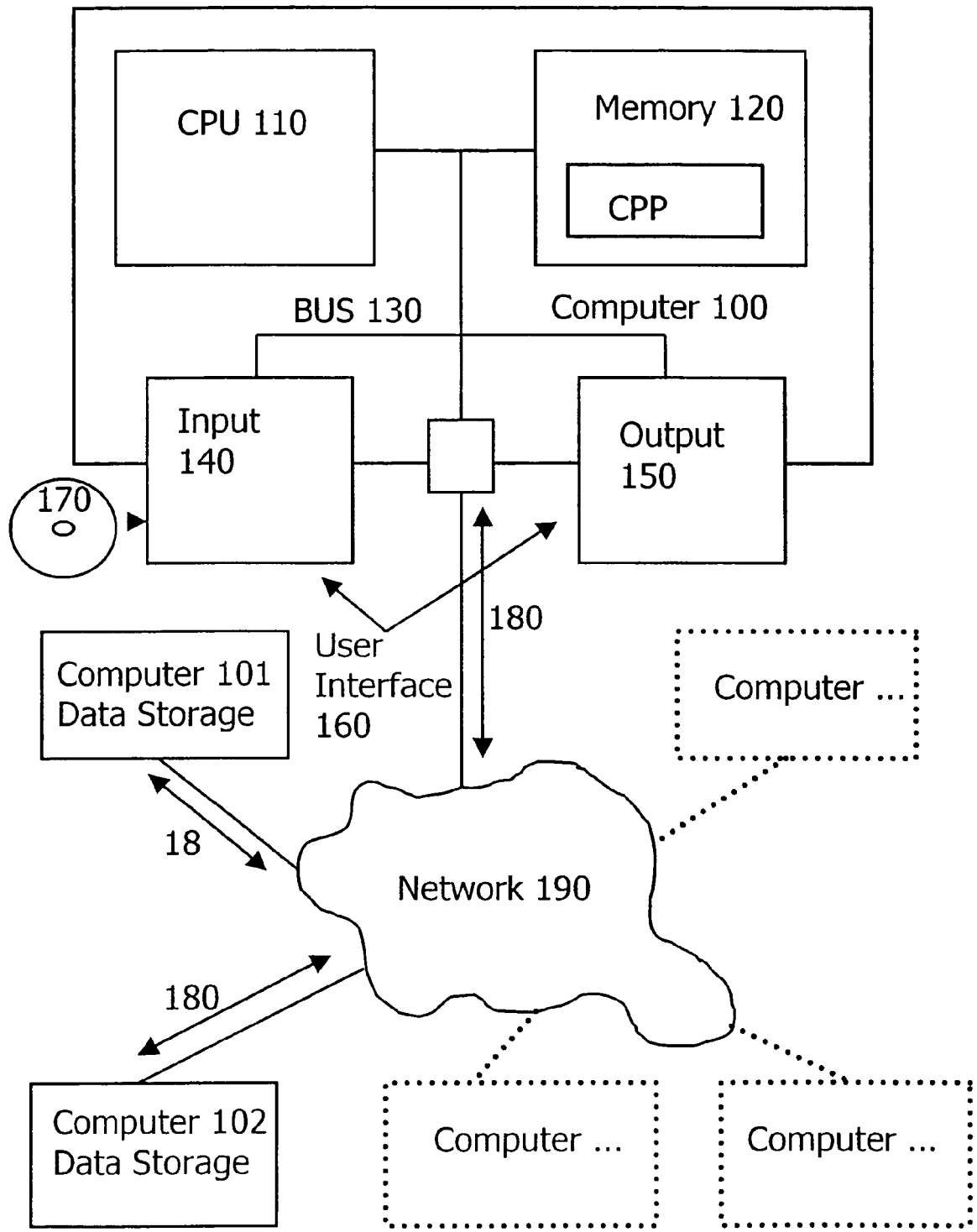
FIG. 1 illustrates a simplified block diagram of an exemplary computer network system according to an embodiment of the present invention.

FIG. 1 illustrates a simplified block diagram of an exemplary computer network system according to an embodiment of the present invention having a plurality of network components 100, 101, 102, etc. that are coupled via a network 190. The network components 100, 101, 102, etc. may be realized, for example, as clients, servers, routers, peer devices or any other common network devices. The network 190 can, for example, be any type of wired (e.g., twisted pair, Ethernet, coax, fiber, etc.) or wireless (e.g., radio frequency, microwave, optical, etc.) communications network, using any of a myriad of communication protocols.

Network component 100 can include a processor 110, a memory 120, a bus 130, and, optionally, one or more input devices 140 and one or more output devices 150 (collectively, I/O devices 140, 150) acting as a user interface 160, interoperating in a conventionally known manner. However, one or more of these elements can be combined or eliminated without deviating from the intended scope of the invention. The present invention can be embodied in a computer program product (hereinafter CPP) residing on a program carrier 170 and/or in the memory 120, and generating program signals 180, collectively called a "program".

The remaining network components 101, 102, etc., which are also referred to as "remote computers," can include many or all of the elements described with respect to the network component 100. Hence, the elements 110 to 180 in the network component 100 collectively illustrate corresponding elements in the other network components 101, 102, etc. of the network 190.

The network component 100 can be, for example, a conventional personal computer (PC), an laptop computer or a hand-held device, a multiprocessor computer, a microprocessor-based or programmable consumer electronics device, a minicomputer, a mainframe computer, a personal digital assistant (PDA), a mobile telephone, a portable or stationary personal computer, a palmtop computer or the like. Further, the network component 100 can communicate with the network using any form of wired or wireless communications.

The processor 110 can be, for example, a central processing unit (CPU), a micro-controller unit (MCU), digital signal processor (DSP), or the like. The memory 120 symbolizes elements or components that temporarily or permanently can store data and/or instructions that can be used by processor 110. Although the memory 120 is conveniently illustrated as a part of the network component 100, a memory function can also be implemented as an independent node in the network 190, in the other components of the network, in the processor 110 (e.g., cache, register, etc.), or elsewhere.

The memory 120 can be a read only memory (ROM), a random access memory (RAM), or a memory with other access options or capabilities. The memory 120 may be physically implemented as machine-accessible media, such as a magnetic media (e.g., a hard disk, a floppy disk, other magnetic disk, a tape, etc.), an optical media (e.g., an optical disk like a CD-ROM, CD-RAM or a digital versatile disk, or DVD), a semiconductor media (e.g., DRAM, SRAM, EPROM, EEPROM, a memory stick, etc.), or by any other media. Optionally, the memory 120 is distributed across different media. Portions of the memory 120 can be removable or non-removable with respect to a particular network component. For reading from media and for writing into media, the network component 100 uses devices well known in the art such as, for example, disk drives, tape drives, memory card, memory stick reader/writers, and the like.

The memory 120 can store one or more software program support modules such as, for example, a basic input/output system (BIOS), an operating system (OS), a program library, a compiler, an interpreter, communication programs, drivers, protocol converters, application software programs like text processors, (Internet-) browsers, database applications, and so on. Although the CPP is illustrated as being stored in memory 120, the CPP can also be located elsewhere. For example, the CPP can also be embodied on the program carrier 170.

The CPP includes program instructions and, optionally, data or variables that cause processor 110 to execute the steps forming the methodology of the present invention. The method steps are explained in greater detail below. The CPP can define and control the operation of the network component 100 and its interaction with the network system 190. For example, and without limitation, the CPP can be available as source code in any programming language, and as object code ("binary code") in a compiled presentation. Persons of ordinary skill in the art can use the CPP in connection with any of the above mentioned support modules, as well as others not mentioned but included within the scope of the invention. The functionalities of one or more of the network components 100, 101, 102, etc. and of the CPP are closely related. Phrases, such as "the computer provides," "the program provides," and the like are used hereinafter to express actions by one or more network nodes that is/are controlled by the CPP in accordance with the one or more embodiments of the invention.

The program carrier 170 is illustrated as being outside the network component 100. For communicating the CPP to the network component 100, the program carrier 170 can be inserted into an input device 140. The carrier 170 can be implemented as any computer readable medium, such as one of the media explained above in relation to memory 120. Generally, the program carrier 170 is an article of manufacture comprising a computer readable medium having computer readable program code and means embodied therein for executing an exemplary method of the present invention. Further, the program signals 180 can also embody the CPP. The signals 180 travel on the computer network 190 to and from the network component 100. The steps of the computer program product CPP can be executed solely in the network component 100, in which case the computer network 190 may be omitted, or can be executed in a distributed manner in one or more of the network components 100, 101, 102, etc. in conjunction with the computer network 190.

The input device 140 can be a device that provides data and instructions for processing by the network component 100. For example, the device 140 can be a keyboard, a pointing device (e.g., a mouse, a trackball, cursor direction keys), a microphone, a joystick, a game pad, a scanner, and the like. While these examples are devices requiring human interaction, the device 140 can also operate without human interaction, such as a wireless receiver (e.g., with/out a satellite dish or terrestrial antenna), a sensor, a counter (e.g., goods counter in a factory), and the like. The input device 140 can also serve to retrieve the program code of the CPP from the program carrier 170.

The output device 150 can be a device that presents instructions and data that have been processed. It can be, for example, a monitor or display (e.g., a cathode ray tube, a flat panel display, a liquid crystal display, etc.), a speaker, a printer, a plotter, a vibration alert device, and the like. Similar to the input device 140, the output device 150 can communicate with the user(s), but it can also communicate with further network components or devices. The input device 140 and the output device 150 can be combined into a single device.

The bus 130 and the computer network 190 can provide logical and/or physical connections to, within and between the network components 100, 101, 102, etc. by conveying instructions and data signals. While the bus 130 can conveniently handle connections and communications inside the network component 100, the network 190 can handle connections and communications between different network components. Optionally, the network 190 can include gateways, routers and the like programmed to effect data transmission and protocol conversion.

The I/O devices 140, 150 can be coupled to the network component 100 by the bus 130, as illustrated, or, optionally, by the network 190. While the signals within the network components 100, 101, 102, etc. and the network 190 can be electrical signals, the signals can also include magnetic, optical and wireless (radio) signals, or any combination thereof.

The network 190 can include one or more of an office-wide computer network, an enterprise-wide computer network, an intranet, an extranet or the Internet (i.e. World Wide Web). The World Wide Web (WWW) represents all of the computers on the Internet that offer users access to information on the Internet via interactive documents or Web pages. Web information can reside on Web servers on the Internet or within company or community networks, such as intranets. Network 190 can include wired or wireless networks, such as, for example, a local area network (LAN), a wide area network (WAN), a wireless LAN (WLAN), a public switched telephone network (PSTN), an integrated services digital network (ISDN), an infrared (IR) or Bluetooth link, a radio link, and the like according to the Universal Mobile Telecommunications System (UMTS), the Global System for Mobile Communication (GSM), a Code Division Multiple Access (CDMA) system, a satellite link and so on.

Transmission protocols, mechanisms and data formats to effect communications between network components that are connected within, to and by the network 190 are known, for example, as transmission control protocol/internet protocol (TCP/IP), hyper text transfer protocol (HTTP), secure HTTP, wireless application protocol (WAP), unique resource locator (URL), unique resource identifier (URI), hyper text markup language (HTML), extensible markup language (XML), extensible hyper text markup language (XHTML), wireless application markup language (WML), electronic data interchange (EDI), which is an electronic exchange of business information between or inside organizations and their information technology (IT) infrastructure in a structured format, remote function call (RFC), via an application programming interface (API), and the like.

Interfaces coupled between individual elements and components are also well known in the art. For simplicity, interfaces are not illustrated. An interface can be, for example, a serial port interface, a parallel port interface, a game port, a universal serial bus (USB) interface, an internal or external modem (wired or wireless), a video adapter, or a sound card.

The software and the hardware infrastructure of an embodiment of the invention utilize the network node 100 having the graphical display unit 150 and the input unit 140, e.g., a mouse or trackball. The network node 100 can be connected to a wide area network (WAN) 190, for operating in an intranet and for providing access to the Internet to which a number of members of a group of the similar or identical network components 101, 102, etc. can also be connected. In order to operate the CPP according to the invention, one or more of the network components 100, 101, 102, etc. can act as a host server that has archival data storage for access by the group. In addition to its server tasks, the host server can also provide firewall and security functions, authenticate the distributed client components connected to the computer network 190, and the like.

The CPP according to the present invention can be part of a complex software system embedded in a hardware structure. The cooperation of the software system and the hardware structure is sometimes referred to as IT backbone system or infrastructure. The backbone system can have a layered structure with individual software components acting in accordance with the client/server concept as service providers, service requesters, or both. For example, application software can include software components that provide services for presentation, or acting as a server. But at the same time the application software also can act as service requester of database services provided by a lower layer. The layered components can communicate with each other via predefined (hardware and/or software) interfaces.

In one exemplary implementation of a layered software structure, a lower layer can include network-related functionalities, a physical database and an operating system for the network components. A middle layer that interfaces with the lower layer can integrate software applications in the upper layer above it. The middle layer can include components like software tools, system administration tools, data handling tools, authorization and security management tools, cross-application modules, a system kernel and so on. The system kernel can use communications and application program interfaces to access components like application software in the upper layer or the operating system, the database, and the network in the lower layer. This system kernel can operate independently from the applications and can be located "under" the application software and the data layers of the software system. The upper layer can contain the different software applications for controlling and monitoring processes relating to, for example, the management of human resources, sales and distribution, financials, materials, manufacturing, inventories, warehousing, and the like.

Figure 2:
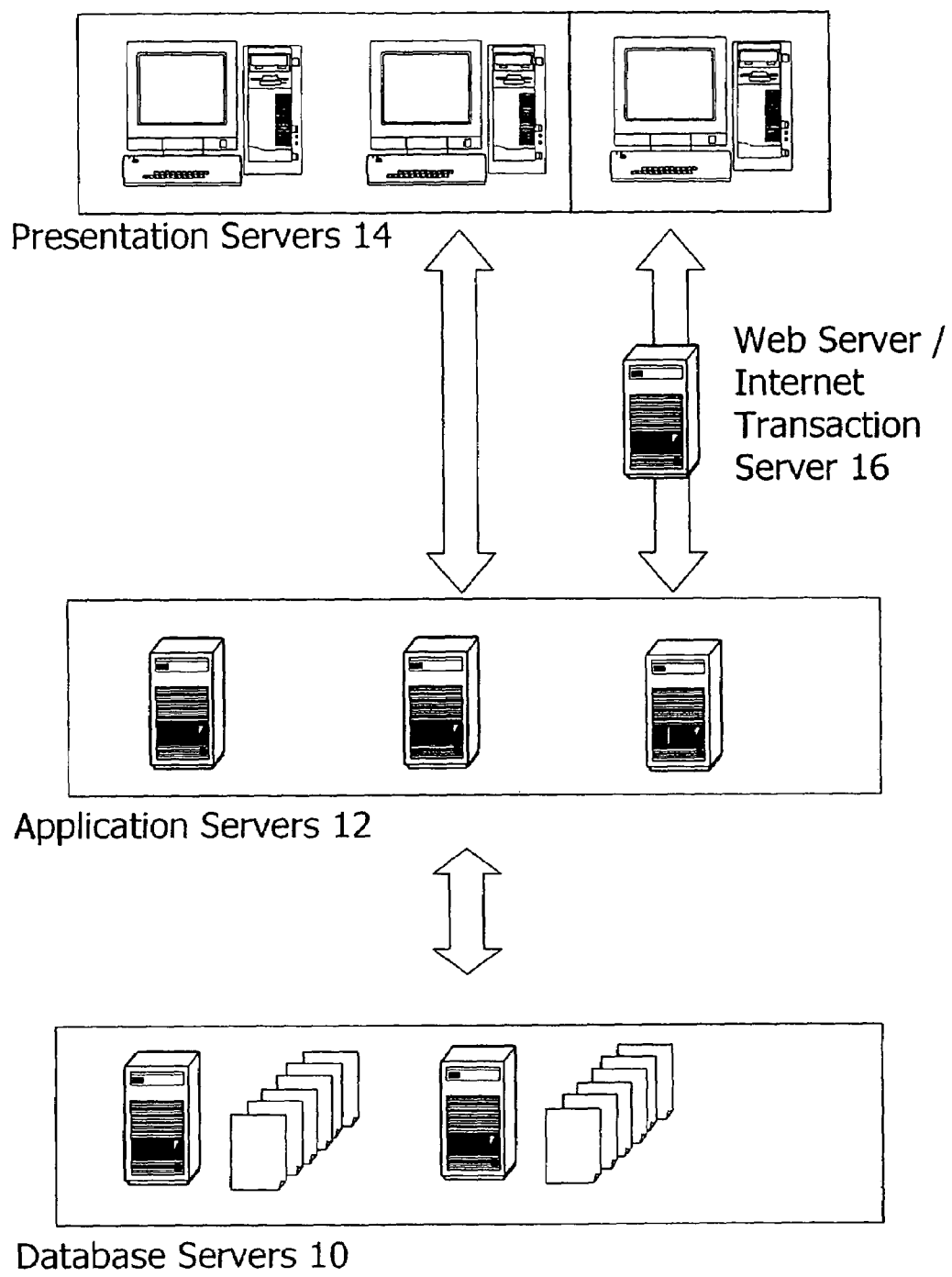
FIG. 2 illustrates a schematic diagram of an exemplary hardware-oriented view of a three-tiered client/server configuration of the system depicted in FIG. 1.

One possible client/server configuration in which an embodiment of the present invention can be carried out is the so-called three-tiered architecture that separates a network system's components into three functional groups: presentation, application, and database. FIG. 2 illustrates a schematic diagram of an exemplary hardware-oriented view of a three-tiered client/server configuration of the system depicted in FIG. 1.

As shown in FIG. 2, each hardware group can be set up to support the demands of its functions. One or more database servers 10 can contain the one or more databases. One or more application servers 12 can interface with the database server (s) 10 and can include the processing logic of the system with services such as spooling, dispatching user requests, formatting data and so on. One or more presentation servers 14, which can be, for example, personal computers or workstations, handle the tasks related to the presentation of data, enabling easy access to the system. Presentation server(s) 14 can include an one or more external servers connected to the application servers 12 via the Internet and/or a web server/Internet transaction server 16. Communication among the three tiers can be accomplished using, for example, standard protocol services mentioned above, such as the ones provided by TCP/IP or Common Programming Interface Communication (CPIC), which can include standard functions and services for program-to-program communication.

Figure 3:
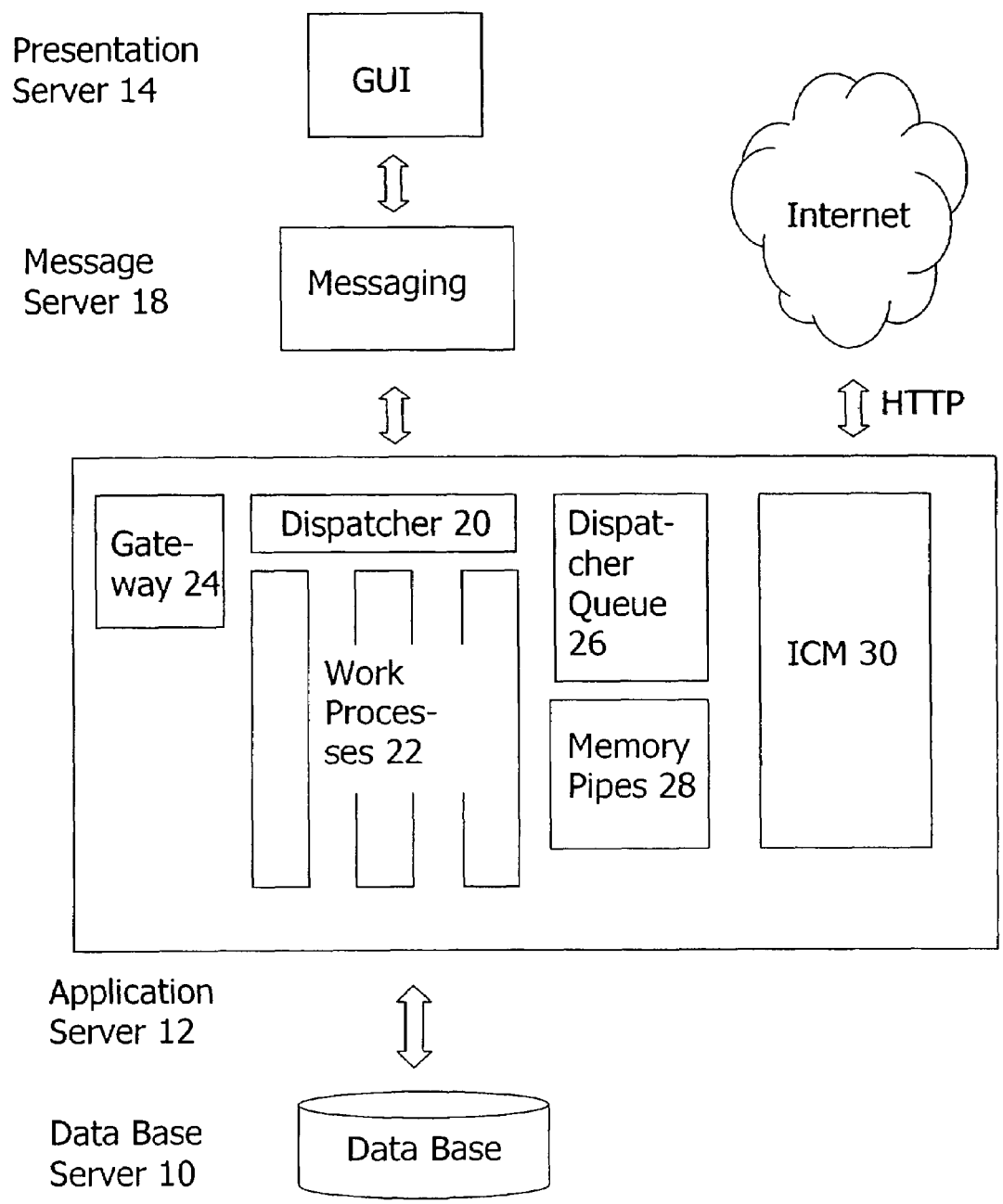
FIG. 3 illustrates a schematic diagram of an exemplary software-oriented view of a three-tiered client/server configuration of the system depicted in FIG. 1.

The three-tiered hardware architecture depicted in FIG. 2 can also be shown in a software-related view. FIG. 3 illustrates a schematic diagram of an exemplary software-oriented view of a three-tiered client/server configuration of the system depicted in FIG. 1. As shown in FIG. 3, the software components used in context with the present invention can include a graphical user interface (GUI) installed on the presentation server 14 of FIG. 2 and an application that runs on the application server 12. The application can have interfaces to the database installed on database servers 10, to the Internet and, via the messaging component installed on a message server 18, to the GUI. The message server 18 can be a service used by different application servers 12 to exchange data and internal/external messages. Tasks of the message server 18 can include the transfer of messages and the distribution of work load between individual application servers 12.

The application running on the application server 12 can include a dispatcher 20 capable of interfacing with the message server 18 and with one or more presentation servers 14 on the one hand, and a plurality of parallel work processes 22 on the other hand. Each work process 22 can include an interface to the database on database server 10. Furthermore, a gateway 24 can either be installed, from a hardware point of view, on the application server 12 or on a dedicated gateway server (not shown). The gateway service provided by the gateway 24 can allow for communication between different applications using, for example, the CPIC protocol. The function of the gateway 24 can exchange large amounts of data between application servers, in contrast to the message server 18, which usually exchanges brief internal and control messages. The application component depicted in FIG. 3 can further include dispatcher queues 26, memory pipes 28 and an Internet Communication Manager (ICM) 30, interfacing with the Internet via, for example, HTTP.

In the following, the co-operation of the individual software components depicted in FIG. 3 is described in more detail.

As data is entered in the presentation server 14, the data can be received by the GUI, converted to a standard format, and sent via the messaging component to the dispatcher 20. The connection between the GUI on the presentation server 14 and the dispatcher 20 is made with a protocol like diagnostic responder protocol (DIAG), according to which small data packages are sent through the network 190 depicted in FIG. 1.

The dispatcher 20 can check whether there are available work processes for processing a request received from the GUI. If no work processes are available, the request can be kept together with other requests in the dispatcher queue 26 until a work process becomes available.

Once a work process becomes available, the dispatcher 20 sends the user data received from the GUI to the available work process 22. A work process 22 can be, for example, a program in charge of executing the application tasks of the present invention. Each work process 22 can act as a specialized system service. From the point of view of an operating system, a group of parallel work processes 22 as depicted in FIG. 3 makes up at least part of a runtime system. Each individual work process 22 can include a task handler, a processor, a memory and a database interface (not shown).

The work processes 22 can execute dialogue steps for the presentation server 14. These steps generally relate to the processing or display of a single GUI screen, which means that right after one work process 22 finishes the execution of a dialogue step for a user session, it can become available for use by another user session (i.e., either from a different user or the same user). For processing purposes, each dialogue step can use code, dictionary objects, data, and the like. These elements can come from one or more database residing on the database server(s) 10 or from an internal memory (not shown) of the application server 12. Within a dialogue step, a task handler (not shown) of a work process 22 can be in charge of assigning the corresponding tasks to the internal components (e.g., processor, dialogue interpreter, database interface, etc.), finally sending a structured query language (SQL) request to the database server(s) 10. The database servers 10 can send the requested data back to the requesting work process 22, which in turn can process it and pass it via the dispatcher 20 to the presentation server 14. The GUI on the presentation server 14 can format the requested data and build up a screen for the user.

If during a particular work process 22, application data has to be exchanged with other applications such as legacy applications or external applications, the functionality of the gateway 24 can be activated.

The ICM 30 can allow for directly processing HTTP requests, or other such protocols, coming from the Internet and/or a browser running on a presentation server 14, and for sending HTTP requests as HTTP client requests to the Internet. The ICM 30, which can be configured as a dedicated kernel process, can use threads to communicate as a server or as a client on the Internet. If a work process 22 is processing an HTTP request, the memory pipes 28 can be used for data transfer. The memory pipes 28 can be, for example, located in a shared memory portion. In its Web client position, a work process 22 can create an HTTP request that is sent to a Web server 16. It can then receive the HTTP response, allowing the work process 22 to proceed on the basis of the HTTP response.

An exemplary database-related process capable of using the technical concept(s), above, according to an exemplary embodiment of the invention will now be described with reference to FIGS. 4 to 10. From a business point of view, the database-related process can be, for example, described as the electronic procurement of goods and services.

The electronic procurement process can, for example, begin with an electronic requirement request to create a shopping cart data set (or simply "shopping cart"), followed by an approval process, if necessary (not shown). Then, a follow-on data set in the form of a purchase order data set (or simply "purchase order") can be created, and a status and tracking query, if desired, can be formulated and processed (dashed line from shopping cart to central database). A consecutive follow-on data set in the form of a goods and services receipt data set (or simply "confirmation") can follow next. Generation of a follow-on data set from the confirmation in the form of an invoice data set, electronic invoice approval and payment (or simply "invoice") can complete the process.

Figure 4:
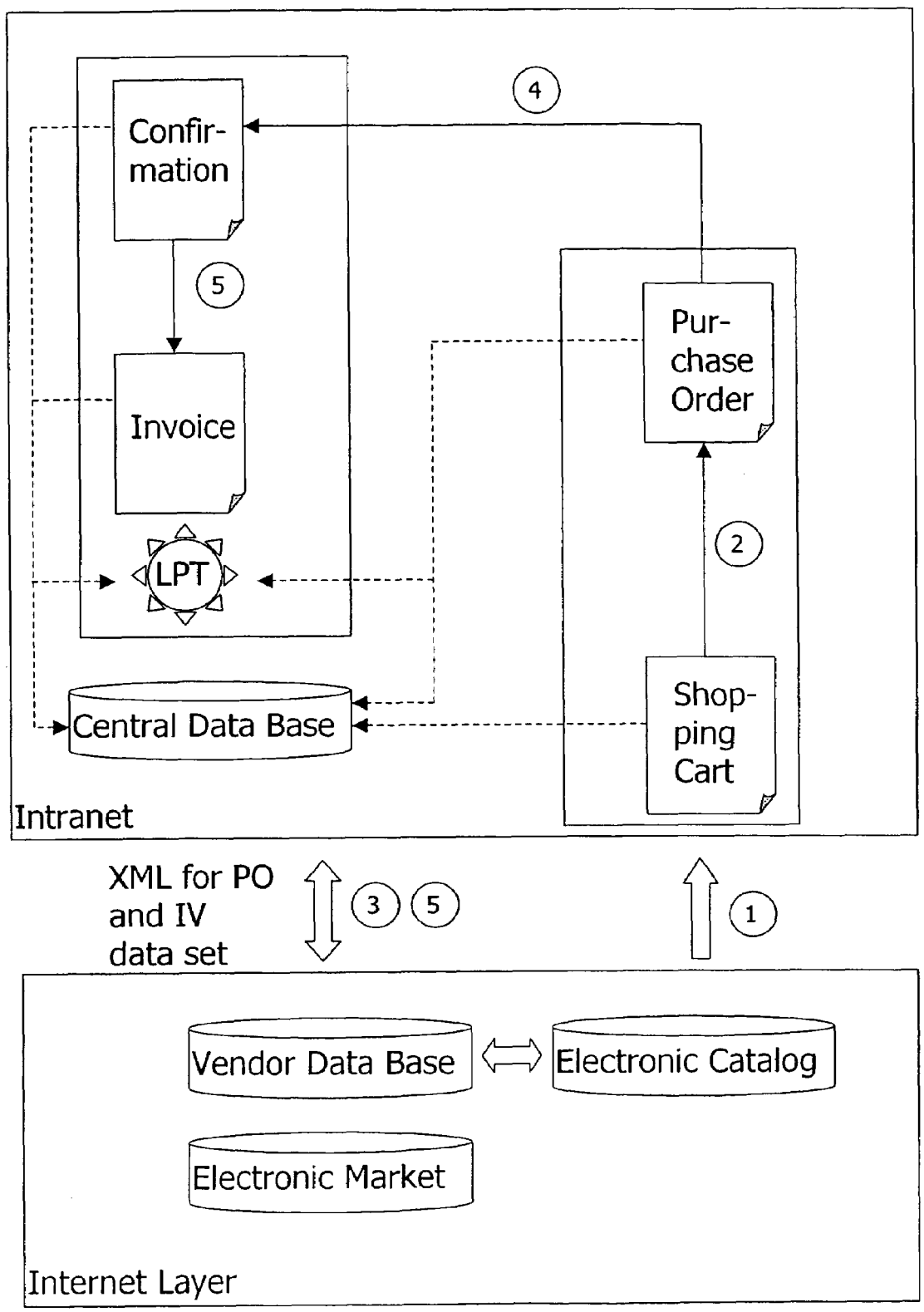
FIG. 4 illustrates a schematic diagram of an exemplary database-related process including the consecutive creation of data sets according to an embodiment of the present invention.

FIG. 4 illustrates a schematic, diagram of an exemplary database-related process including the consecutive creation of data sets according to an embodiment of the present invention. As shown in the exemplary embodiment of FIG. 4, the entities involved in the electronic procurement process can include a company's intranet, as well as an Internet layer attached to the intranet as has been explained with reference to FIG. 3. The intranet, for example, can include presentation services, message services, application services, database services, and the like, while the Internet layer can include Internet transaction services and WWW services for hosting various databases, such as an electronic catalogue or a vendor database, as well as for providing an electronic market place. The electronic market place focuses on the efficiency of virtual communities and provides a collaborative platform that can enable electronic procurement across multiple software/hardware systems and services. The electronic market place, for example, can provide the necessary infrastructure for virtual markets, allowing multiple organizations to electronically communicate for the purpose of conducting collaborative processes. A network component located in the intranet of FIG. 4 can access the electronic market place, for example, to publicly post a request for quotation (RFQ) for certain materials or services. Once the request is posted, bidding on the request can be performed. Once a bid is accepted, all necessary data sets (like purchase orders, invoices, etc.) can be transferred via the electronic market place, thereby forming a closed-loop scenario.

In a first step of the electronic procurement process depicted in FIG. 4, a search of the electronic catalogue can create a shopping cart. The electronic catalogue can be regularly updated, which, for example, can facilitate real-time pricing and availability checking for goods or services to be ordered. Updating of the electronic catalogue can be performed via a vendor database or vendor catalog. The electronic catalogue can also be wholly or partly updated manually. It should be noted that the electronic catalogue may partially or completely be located in a central database of the intranet. Instead of or in addition to using the electronic catalogue, requirements for a product or service to be ordered may be entered directly on a GUI of a presentation server and transferred to the shopping cart.

A shopping cart can include a single data item (e.g., product category) or a plurality of data items in the case of complex orders. Additionally, each shopping cart can include a header with general data (e.g., time stamp, denomination, etc.) and a follow-on data set table. The follow-on data set table can contain the follow-on data set records for the shopping cart or references to these records. As a result, the individual processing stages can be documented and dependencies can be saved.

Once a shopping cart has been created, the requirements comprised therein may be held or ordered. When holding the requirements, the shopping cart can be temporarily stored locally (or externally) for processing at a later time. When the user wishes to initiate the next processing stage (i.e., the purchase order), including creation of a follow-on data set, the application server checks whether the shopping cart needs to be approved. Generally, but not always, a requirement request (i.e., shopping cart) should be routed for approval before a purchase order is created. To this end, the application server can inform a user responsible for releasing or approving the purchase order using a Web-compatible work process. Approval can be carried out using an automated release strategy or, if the requisition is above a predefined threshold allowed for automatic approvals, by initiating a Web-compatible approval work process involving the approver's presentation server.

If a shopping cart is approved or if it is determined that no approval is required, the system automatically creates a follow-on data set in the form of a purchase order (step 2). Both the shopping cart and the purchase order can be stored in the central database of the intranet, although other storage mechanisms are equally applicable. On creation of the purchase order, a reference to this follow-on data set can be written in the follow-on data set table of the shopping cart. By this, a purchase order can be associated with the shopping cart from which it originated. It should be noted that multiple individual purchase orders can be created from a single shopping cart. This may be the case, for example, if different data items (e.g., goods and/or services) of the shopping cart are ordered from different vendors.

Once a purchase order has been created, it can be sent electronically via the Internet to the vendor's system (step 3) using, for example, XML. Other messaging protocols and messaging services, like e-mail or electronic data interchange (EDI), may be used also. As an alternative to sending the purchase order to a particular vendor, it can also be placed on the electronic market place as mentioned above (step 3).

After the goods are delivered or the services have been performed, a confirmation work process can be executed using, for example, a dedicated GUI (step 4). During the confirmation work process, a follow-on data set can be created as will be explained below in more detail. The confirmation work process can be initiated via a presentation server located in the intranet or via the vendor's system attached to the intranet via the Internet layer. If the confirmation is entered from the vendor's system, an approval work process can be started within the intranet. During the approval work process a presentation server of the intranet can display a GUI that requests confirmation approval.

Once the confirmation has been created, a reference to this follow-on data set can be written in the follow-on data set table of the shopping cart. Additionally, the confirmation can be stored in the central database of the Intranet and, if required, printed by a printer via, for example, a line printer terminal (LPT). It should be noted that for a single purchase order two or more confirmations can be created, for example, when the ordered goods are received with different deliveries. In such a case a first confirmation can be created for the initial delivery and a second (or more) confirmation can be created for the amount of goods still open after the first delivery.

In a fifth step, a further follow-on data set in the form of an invoice can be created by the vendor's system and transferred, for example, by XML to the intranet where it can be stored in the central database. At the same time a reference to this newly created follow-on data set can be written in the follow-on data set table of the shopping cart and an approval work process can be started. During the approval work process, a presentation server of the intranet can display a GUI that requests invoice approval. If required, the invoice may be printed using the printer via LPT.

It should be noted that in principle the invoice can also be created solely within the intranet. On the other hand, the confirmation need not be created within the intranet, but can be created by the vendor's system and transferred to the intranet via the Internet layer.

As has become apparent from the above, the electronic procurement process described with reference to FIG. 4 involves the distributed handling of a plurality of data sets including an initial data set (shopping cart) and three independent follow-on data sets (purchase order, confirmation, invoice). However, as will be evident to those skilled in the art from the disclosure of this exemplary embodiment, one or more of these data sets can be eliminated, or one or more other data sets can be added, without deviating from the intended scope of the invention. Creation of a particular follow-on data set can be performed using a work process that involves one or more dialogue routines as generally depicted in FIG. 5.

Figure 5:
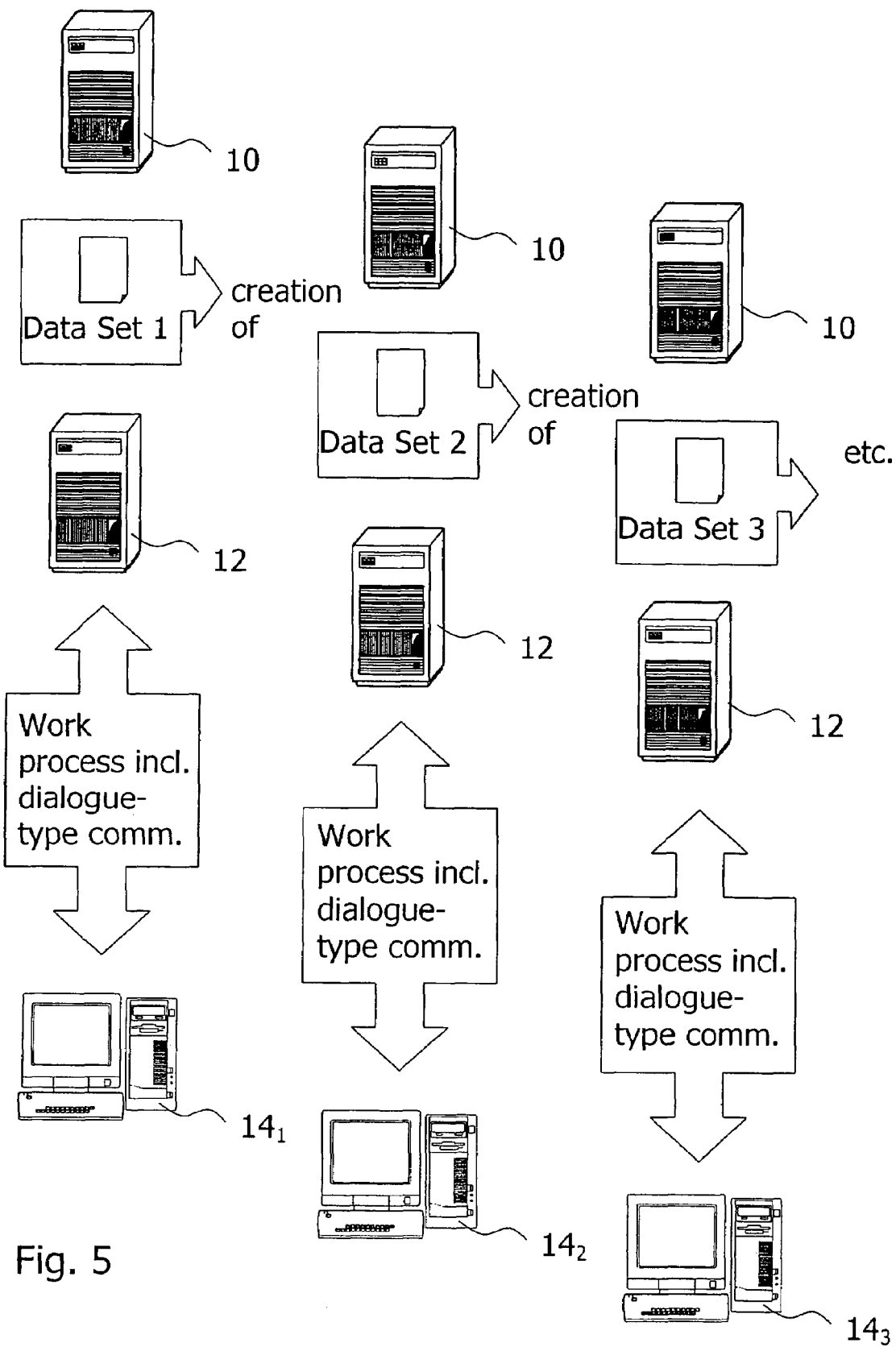
FIG. 5 illustrates a schematic diagram of an example of the consecutive creation of data sets using dialogue-type communications according to an embodiment of the present invention.

FIG. 5 illustrates a schematic diagram of an example of the consecutive creation of data sets using dialogue-type communications according to an embodiment of the present invention. As shown in FIG. 5, the consecutive creation of follow-on data sets generally starts with an initial data set (data set 1), such as a shopping cart or a purchase order, stored by the database server 10. Creation of a particular follow-on data set (data set 2), such as a purchase order or a confirmation, can involve a dedicated work process with a plurality of interactive, dialogue-type communications. For example, in the case where a follow-on data set in the form of a confirmation is created, this interactive, dialogue-type communication can involve the input of data like the amount to be confirmed, the delivery date, and the like. These dialogue-type communications can usually be performed between application server 12 and a particular presentation server 14$_1$. However, it can also be performed across several presentation servers (not shown).

Once the confirmation (data set 2) has been created, a further work process including similar dialogue-type communications can be performed to create the next follow-on data set (data set 3) like, for example, an invoice. As has been mentioned above with reference to FIG. 4, creation of the invoice can involve the presentation server 14$_2$ located on the vendor's side.

The consecutive creation of follow-on data sets may continue involving a further work processes, including further dialogue-type communications and a further presentation server 14$_3$ as depicted in FIG. 5.

Figure 7:
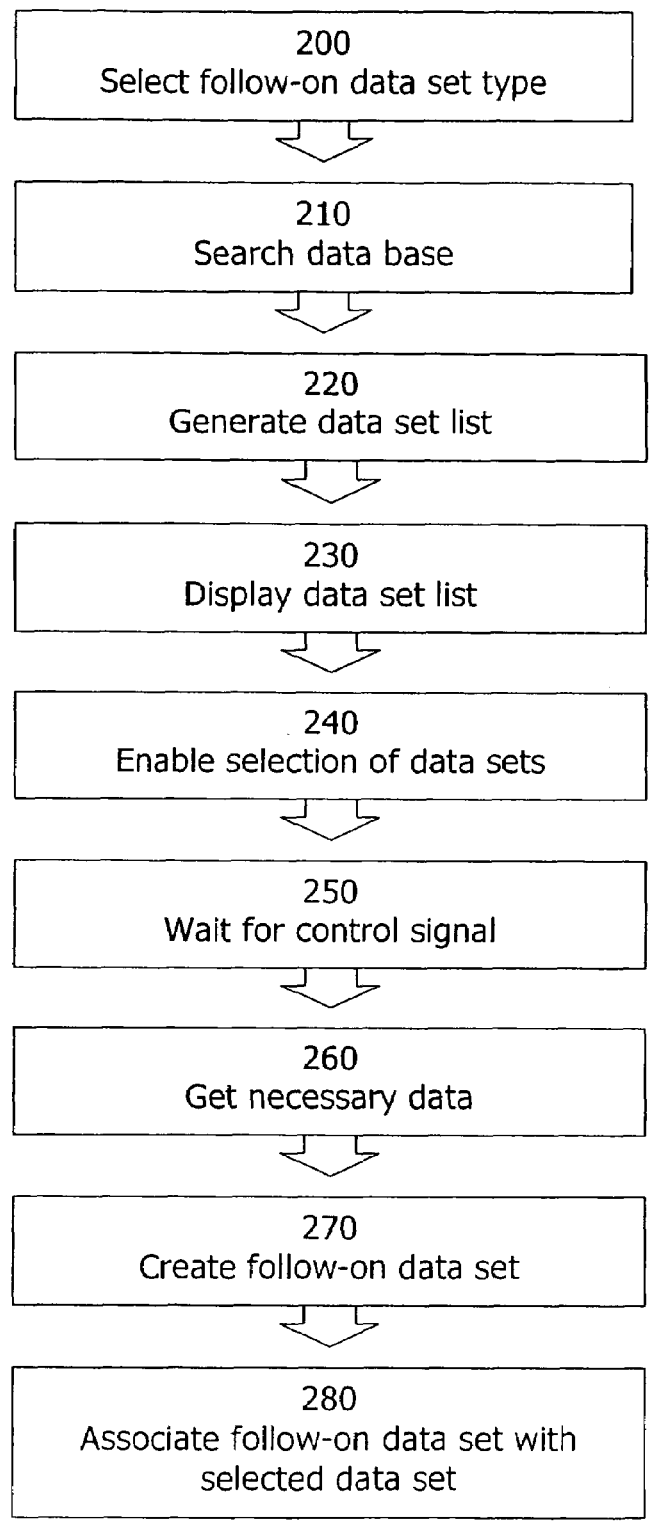
FIG. 7 illustrates a flowchart of an example of the basic steps for automatically creating a follow-on data set according to an embodiment of the present invention.
Figure 8:
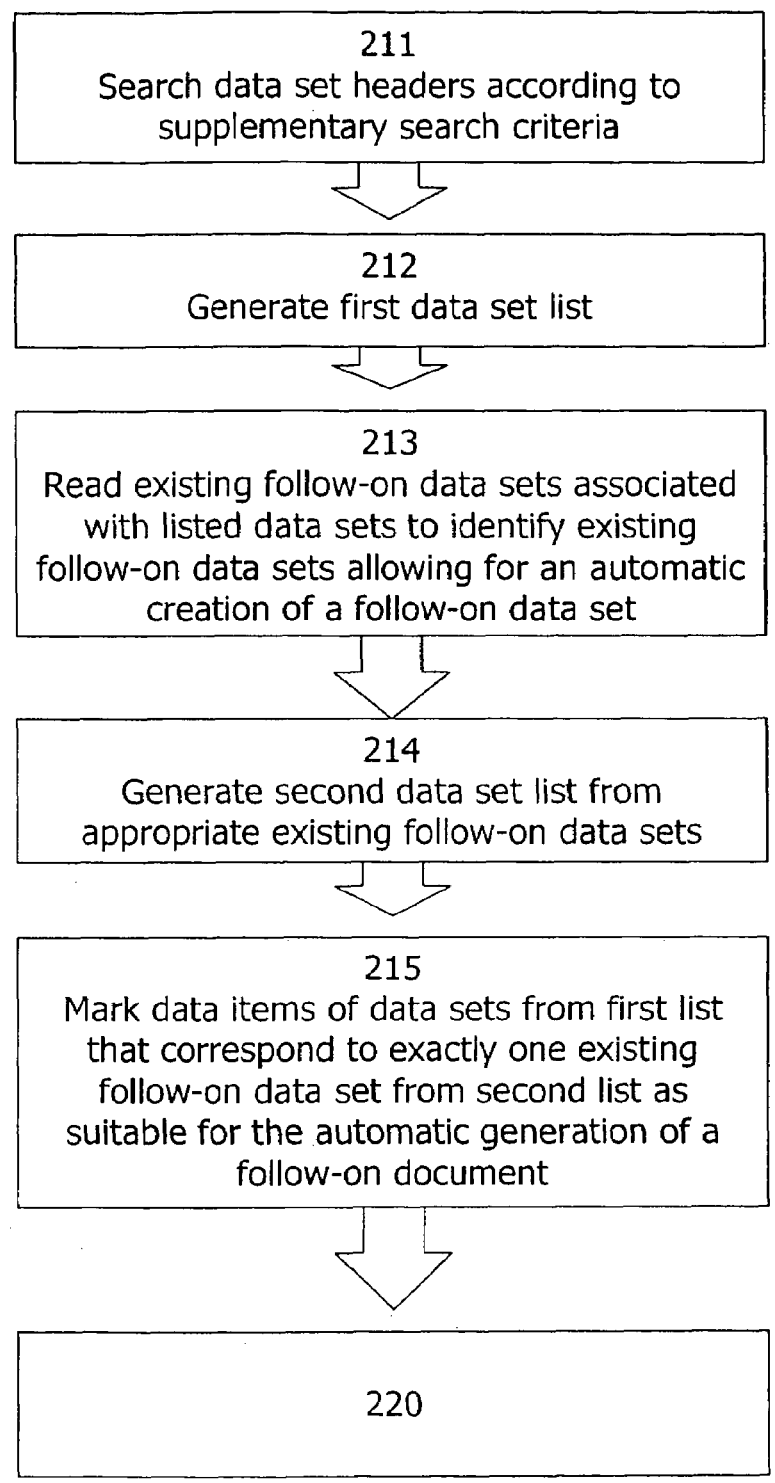
FIG. 8 illustrates a flowchart of the generation of an exemplary list of data sets suitable for the automatic creation of follow-on data sets according to an embodiment of the present invention.

In the following, an embodiment of the present invention that includes the skipping of one or more of the dialog-type communications illustrated in FIG. 5 will be described with reference to FIGS. 6 to 8. According to this embodiment, one or more follow-on documents, such as, for example, confirmations or invoices, can be created automatically. Moreover, in this embodiment the follow-on documents may not be created for individually retrieved data sets, but from a user-defined list of data sets that allow for the creation of follow-on data sets. This approach facilitates the mass handling of data sets.

Figure 6:
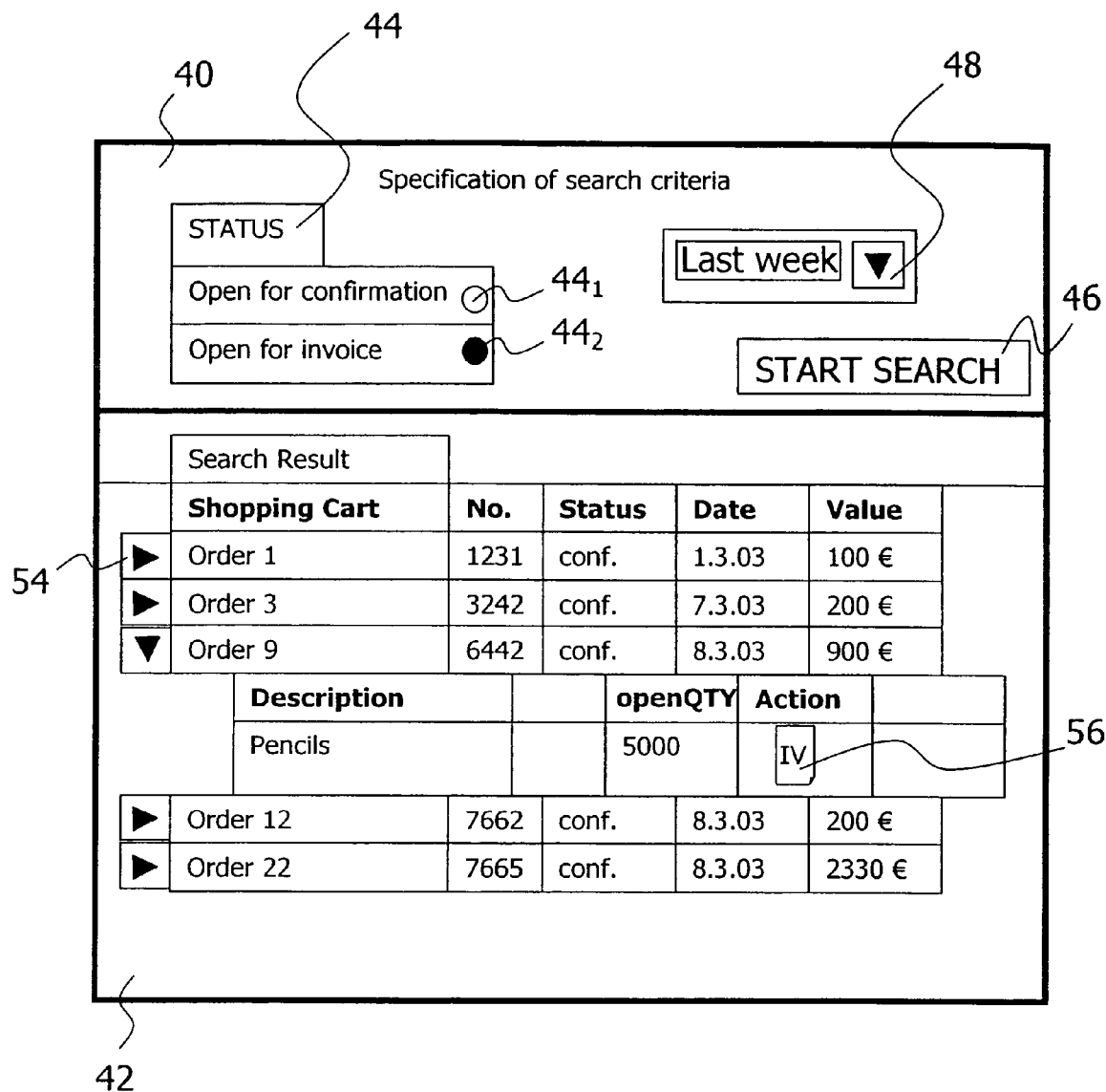
FIG. 6 illustrates a schematic diagram of an example of the appearance of a graphical user interface used in context with an embodiment of the present invention.

FIG. 6 illustrates a schematic diagram of an example of the appearance of a graphical user interface (GUI) used in context with an embodiment of the present invention. As shown in FIG. 6, a browser-based GUI of a presentation server can communicate with one or more application servers according to, for example, the HTTP protocol. The GUI can include a first portion 40 for specifying user-defined search criteria that can be considered during generation of a data set list and for initiating the generation of this list. In a second portion 42 of the GUI, the generated list can be displayed at least partially, namely, in the form of selected information derived from the individual data set headers.

The exemplary GUI of FIG. 6 is part of a function for checking a shopping cart status. Using this function, users can check the status of individual data items in their shopping carts according to user-defined criteria. Thus, information about each particular data item of a shopping cart can be tracked as an order associated with the data item is processed by the individual stages of the electronic procurement process. Provided the system has not yet created any follow-on data set(s) for a shopping cart, the system allows changes to the individual data items. As soon as a follow-on data set has been created, the shopping cart and the individual data items comprised therein can be locked.

The search portion 40 of the exemplary GUI of FIG. 6 can include a status selector 44. The status selector 44 can enable a selection of a particular follow-on data set type that is to be automatically created, for example, either a confirmation ("Open for confirmation") or an invoice ("Open for invoice"), as shown. The status selector 44 thus allows to either select the follow-on data set type "confirmation" or the follow-on data set type "invoice". An individual control element $44_1$, $44_2$ can be associated with each follow-on data set type displayed in the search portion 40. Each of the individual control elements $44_1$, $44_2$ can be configured for activation by a user-operated pointing device, like a mouse, to generate a control signal indicative of the selected type.

In FIG. 6, for example, the control element $44_2$ associated with the follow-on data set type "invoice" has been activated. This means that upon activation of the "START SEARCHING" control element 46, a list of shopping carts that are open for invoice and that allow for the automatic creation of a follow-on data set of the type "invoice", can be generated.

Additionally, the search window 40 includes a further control element 48 that allows for a specification of another search criteria. This second search criteria, for example, can relate to the creation date of the shopping cart data sets that are to be included in the list. In the view depicted in FIG. 6, all shopping carts that are open for invoice and that have been generated within the last week will be listed. Although not shown in FIG. 6, further search criteria, for example, like the name of a shopping cart or a description of a particular data item may be specified.

Additionally, with respect to the display portion 42 of the FIG. 6 GUI, an individual control element 54 can be related with each shopping cart. The control element 54 can be configured for activation by a user-operated input device, like a mouse, to generate a dedicated control signal. Activation of an individual control element 54 can enable an expansion of (i.e., the display of additional information about) a particular shopping cart for which the previously specified follow-on data set, i.e., an invoice, is to be automatically created.

Upon activation of a control element 54 associated with a particular shopping cart, a control signal can be generated that requests the expansion of the shopping cart or, more particularly, the display of the one or more individual data items of the shopping cart that allow for the automatic creation of an invoice. Simultaneously, a further control element 56 associated with the data item that allows for the automatic creation of an invoice can be displayed.

In the view depicted in FIG. 6, the shopping cart titled "Order 9" has been expanded after activation of the control element 54 associated with this shopping cart. The expanded shopping cart titled "Order 9" includes a single data item "pencils" that is ready for automatic invoicing. Together with the description of the data item, the open quantity to be invoiced (i.e., the confirmed but not yet invoiced quantity) and the control element 56 for initiating the automatic creation of an invoice for the data item "pencils" and the specified open quantity are displayed.

Referring now to the flow chart of FIG. 7, the steps involved when performing the method according the FIG. 6 embodiment of the present invention will be described in more detail.

The method starts with selecting a particular follow-on data set type as described above with reference to the status selector 44 of the GUI's search portion 40 and by the optional specification of further search criteria (step 200). Once the user activates the "START SEARCH" control element 46, an HTTP control signal, for example, can be generated and sent from the presentation server to the application server. This control signal can include the search criteria and can request the application server to initiate a search in the one or more databases stored on database server (step 210). In the scenario depicted in FIG. 6, the search relates to all shopping carts that have been created during the last week and that include one or more data items allowing for the automatic creation of an invoice. The database server can deliver information about the shopping carts that match the criteria back to the application server for generating the shopping cart list (step 220) as will be described later with reference to FIG. 8.

Once the data set list has been generated, it can be transferred from the application server to the presentation server for displaying in the display portion 42 of the GUI (step 230). As can be gathered from FIG. 6, the displayed shopping cart list includes, for each shopping cart matching the search criteria, the shopping cart name, a characteristic number assigned to the shopping cart, the shopping cart status (here, conf.="confirmed"), the creation date of the shopping cart and the total value associated with the shopping cart. This information can correspond, for example, to the information included in the shopping cart header. However, more or less information can also be included.

As soon as a shopping cart is expanded and the data item that allows for the automatic creation of an invoice as well as the associated control element 56 are displayed, a selection of this data item (and thus of the corresponding shopping cart) for automatic creation of an invoice can be enabled (step 240). The GUI now waits for generation of a control signal by activating the control element 56 (step 250). As soon as a user activates the control element 56, a control signal can be generated that initiates a work process associated with the automatic creation of an invoice for the selected data item. This work process can skip the dialogue-type communications illustrated in FIG. 5 and can create the invoice for the selected data item (i.e., "pencils") in a background process. Background processing allows for shorter processing time than the processing time of an interactive process, for example, as the ones depicted in FIG. 5. Not only are access delays reduced and transitions between consecutive processing stages facilitated, but processing resources within the application server are released and time out errors often associated with the time-consuming interactive generation of follow-on data sets are avoided.

The background work process associated with the automatic creation of a follow-on data set in context with the present invention includes a plurality of steps that are performed chronologically when the control element 56 in the display portion 42 of the FIG. 6 GUI is activated. These steps can include, for example, an authorization control step, a refreshing of pertinent data set tables, an evaluation of the data set history to derive the required data for generation of the particular follow-on data set (step 260), a locking of one or more existing data sets associated with the selected data set for which a follow-on data set is to be created, the preparation of an approval work process, the creation of the requested follow-on data set (i.e., of the invoice) (step 270) and storing of the newly created follow-on data set.

In a last step 280 the newly created follow-on data set (invoice) is associated with the selected data item. This can be done by writing a reference to the newly created follow-on data set in the follow-on data set table of the initial data set (i.e., the shopping cart).

During step 260, for example in the context of FIG. 6, during generation of the data required for creating the invoice for the data item "pencils", or earlier (e.g., prior to step 230), an assignment routine can be performed that derives the not yet invoiced but already confirmed quantity. In the case of partial invoices that have been created earlier using, e.g., manual dialogue-type communications as depicted in FIG. 5, these partial quantities can also be taken into account when calculating the open quantity that is to be automatically invoiced. When deriving the required data for automatically creating the invoice, the initially ordered quantity specified in the shopping cart can be compared with the quantity that has already been invoiced and the remainder can automatically be invoiced. In order to determine the quantity that has already been invoiced, one or more invoices that have already been created for the particular data item "pencils" in FIG. 6 are taken into account and the accumulated already-invoiced quantity is determined.

In principle, the data required for automatically creating the invoice (or any other follow-on data set, like a confirmation) may be derived during various processing steps. The data may, for example, already be derived when searching the database and creating the data set list according to the user-defined criteria, i.e., during one or both of steps 210 and 220 in FIG. 7. This allows the data from which the automatic creation of the requested follow-on data set is based to be displayed simultaneously with the control element 56 for initiating the automatic creation of the requested follow-on data set.

This means, in the context of FIG. 6, that the open quantity can already be calculated prior to displaying the data set list (step 230) so that the open quantity may be displayed together with the control element 56. Hence, the user is informed for which quantity an invoice will be generated upon activation of the control element 56. However, some or all of the data required for automatically generating the invoice or any other follow-on data set may additionally or alternatively be derived after the control element 56 has been activated (e.g., during the background work process, described above).

In the following, the process of searching the database (step 210 in FIG. 7) for matching shopping carts will be explained in more detail with reference to the flow chart of FIG. 8.

In a first sub step 211, the shopping cart headers in the database can be searched according to the supplementary search criteria only (i.e., the temporal criteria selected by control element 48 in the search portion 40 of the GUI depicted in FIG. 6). In sub step 211, the type of follow-on data set (i.e., invoice) selected using the control element 44 can be disregarded. In sub step 212 a first list is generated from all shopping carts that were created within the last week as specified by control element 48 in FIG. 6, regardless of whether they allow for the automatic creation of an invoice.

In a next sub step 213 all previously created confirmations associated with the shopping carts of the first list can be determined by reading the appropriate confirmation data sets. For each data set of the first list from step 212, one or more confirmations, if existing, can be evaluated to find out whether the automatic creation of an invoice is possible for the particular data set of the first list. In this context it is determined, for example, if there is a quantity greater than zero open for invoicing (i.e., already confirmed but not yet invoiced). Otherwise, no automatic invoicing can be performed. Simultaneously, the amount open for invoicing can be calculated for displaying later in the data field "open QTY" of the GUI's display portion 42. As has been mentioned above, the evaluation can be performed on a data item basis.

All confirmation data sets that are associated with a shopping cart for which it has been determined that an invoice can automatically be created are accumulated in a second list in sub step 214.

In the following sub step 215 the second list can be evaluated and all shopping carts from the first list that include at least one data item allowing for the automatic creation of an invoice are marked accordingly. The marked data set list can then be used as the basis for generating the GUI as depicted in FIG. 6 (display portion 42). Only for the marked data items of the shopping carts a control element 56 will be shown upon expansion of the corresponding shopping cart. As will be evident to those skilled in the art from the disclosure of this exemplary embodiment, the order in which the lists are processed can be reversed. Further, additional search criteria can be similarly used to create the list(s).

Figure 9:
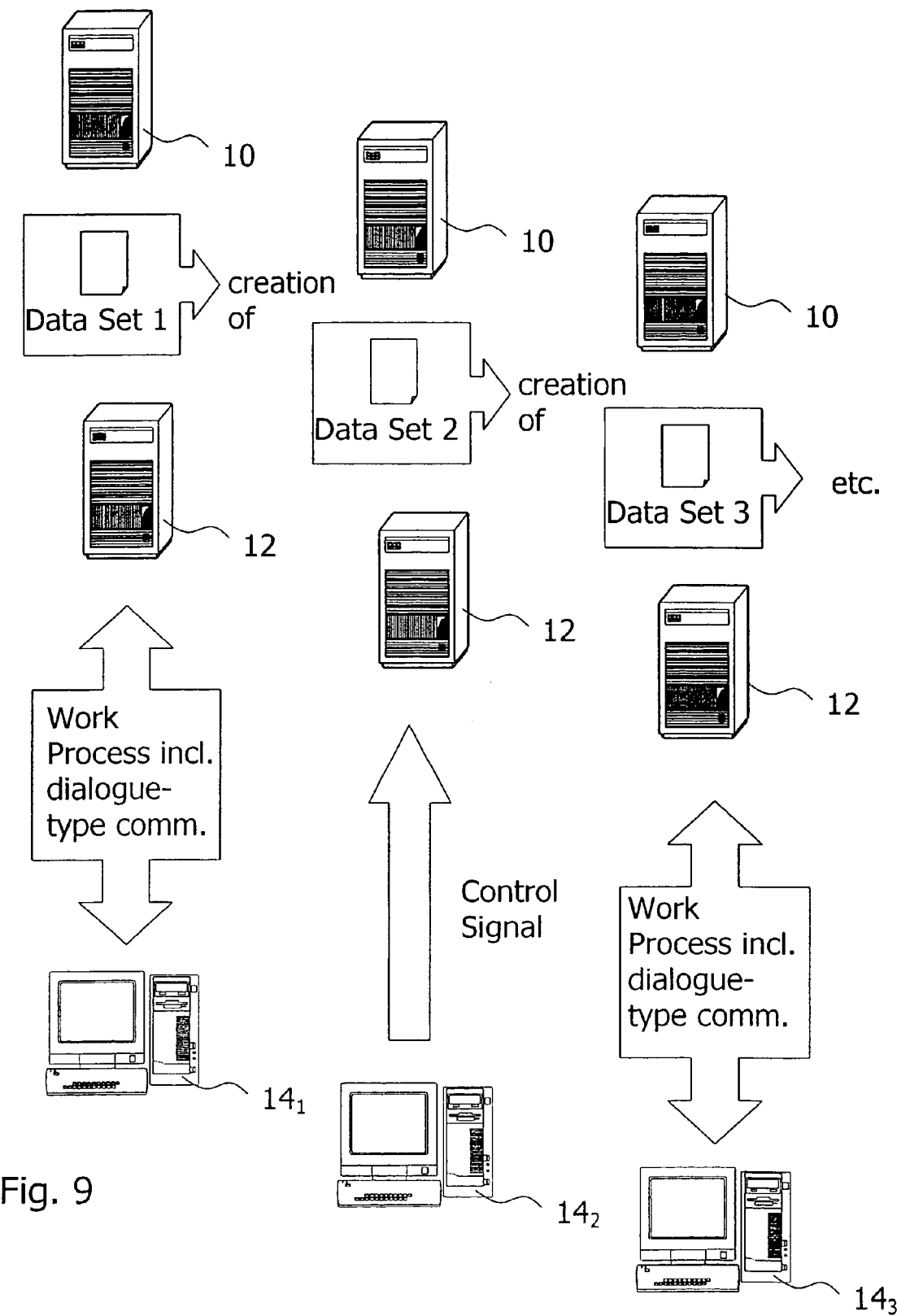
FIG. 9 illustrates a schematic diagram of an example of the automatic creation of data sets according to an embodiment of the present invention.

The basic differences between an electronic procurement process involving only work processes with dialogue-type communications as depicted in FIG. 5 and an electronic procurement process making use of the automatic creation of follow-on data sets as described above with reference to FIGS. 6 to 8 become apparent from the schematic diagram shown in FIG. 9.

FIG. 9 illustrates a schematic diagram of an example of the automatic creation of data sets according to an embodiment of the present invention. The schematic diagram of FIG. 9 corresponds, with discussed deviations, to the diagram shown in FIG. 5. As shown in FIG. 9, one work process including dialogue-type communications, namely the creation of an invoice (data set 3), has been skipped due to the generation of the control signal as a result of activating the control element 56 depicted in FIG. 6. Thus, the dialogue-type communications performed by presentation server $14_2$ in FIG. 5 has been substituted with a background work process involving only the application server 12 and the database server 10 as shown in FIG. 9.

Figure 10:
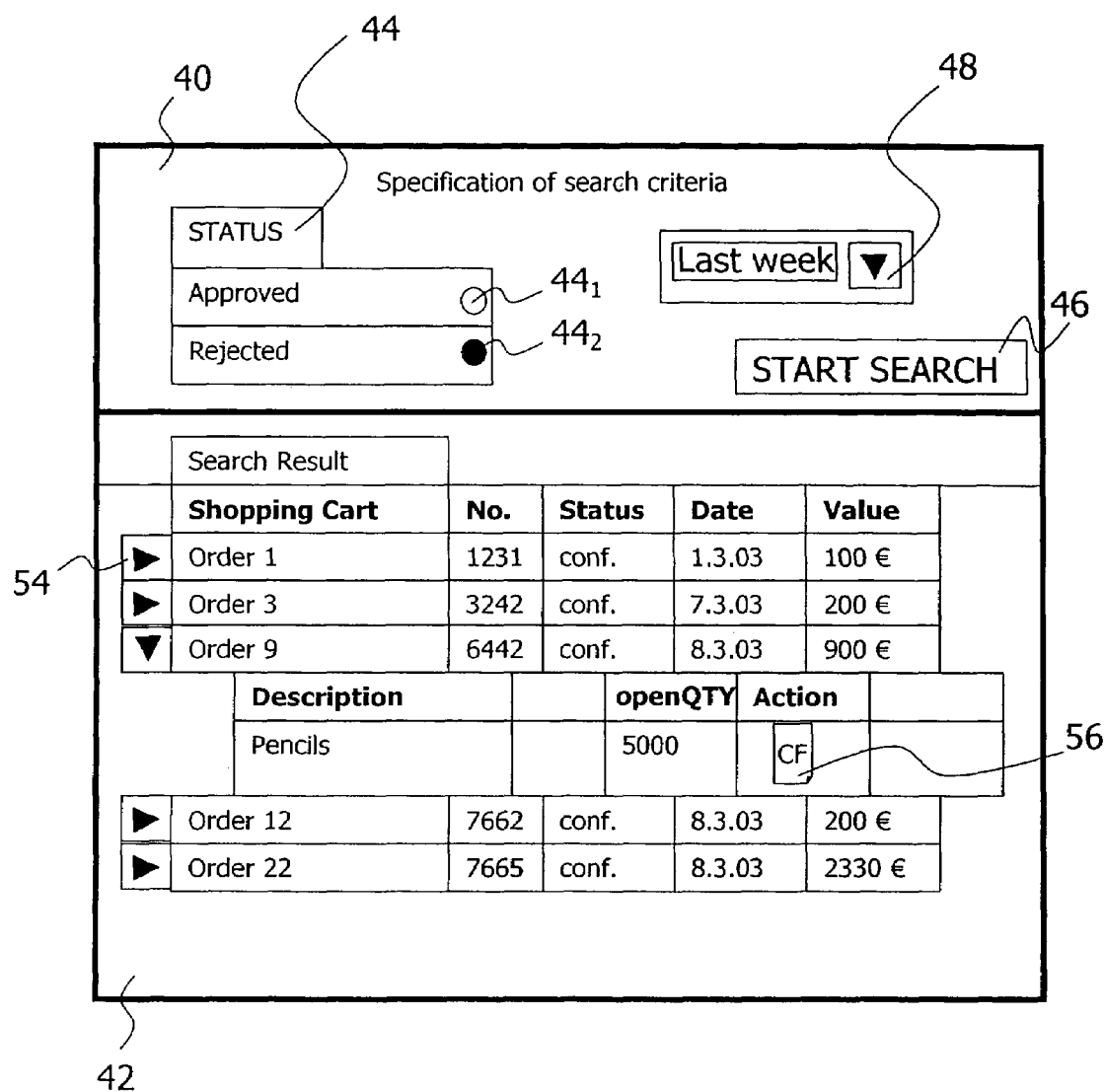
FIG. 10 illustrates a schematic diagram of an exemplary appearance of a graphical user interface used in context with an embodiment of the present invention.

Another embodiment of the invention will be described with reference to FIGS. 10 and 11. In FIG. 10, a GUI similar to the GUI depicted in FIG. 6 is shown. Corresponding elements are denoted with corresponding reference signs and a more detailed description thereof is omitted. Instead, only the differing aspects will be explained.

FIG. 10 illustrates a schematic diagram of an exemplary appearance of a graphical user interface used in context with an embodiment of the present invention. As shown in FIG. 10, the display portion 40 of the GUI has a status selector 44 that does not enable a selection of a particular follow-on data set type (e.g. confirmation/invoice) but only a selection between the two shopping cart selection criteria "approved" and "rejected." Consequently, the search routine can generate a list of shopping carts that includes shopping carts for which no follow-on data set can be created automatically. Upon expansion of such a shopping cart in the display portion 42 of the GUI, no associated control element will be displayed in the action fields of the individual data items. This indicates that automatic creation of any follow-on data set is disabled.

Once initiated, as explained for the embodiment of FIG. 6, the search routine can evaluate the individual shopping carts matching the search criteria not only with respect to the question of whether a follow-on data set can automatically be created for any data item of this particular shopping cart, but additionally with respect to the particular type of follow-on data set that can be created. This type information can additionally be included in the data stream from the application server to the presentation server and can enable the presentation server's GUI to display an appropriate type of control element as will now be explained in more detail.

For each follow-on data set type (i.e. confirmation/invoice) an individual control element type can be defined. This becomes apparent from FIG. 10. For example, in the data item "pencils" of shopping cart "Order 9," a confirmation can automatically be created. This can be indicated by the caption "CF" of control element 56 ("CF type"). If the data item "pencils" allowed for the automatic creation of an invoice, the control element 56 would be captioned "IV" ("IV type") as shown in FIG. 6.

Together with the description of the data item, the open quantity to be invoiced (i.e., the confirmed but not yet invoiced quantity) and, if the data item allows for the automatic creation of a follow-on data set, the appropriate type of control element 56 for initiating the automatic creation of the particular follow-on data set (here: an invoice for the data item "pencils") can be displayed as shown in FIG. 10.

Figure 11:
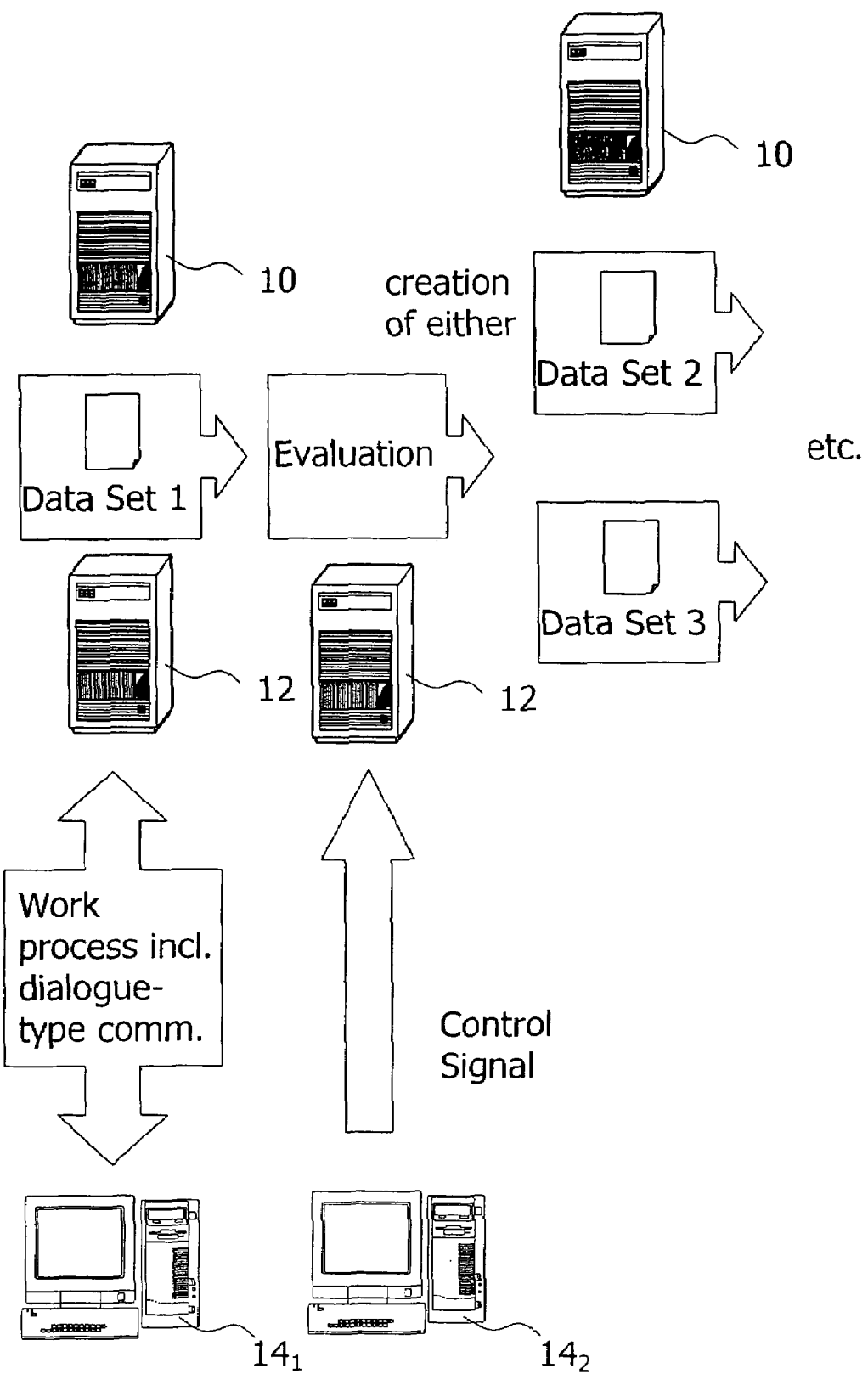
FIG. 11 illustrates a schematic diagram of the automatic creation of data sets according to an embodiment of the present invention.

The basic concept underlying this embodiment of the invention is schematically illustrated in the diagram of FIG. 11. As shown in FIG. 11, the shopping carts of the shopping cart list can individually be subjected to an evaluation step during which can determine if a particular shopping cart includes a data item that allows for an automatic creation of a follow-on data set. If this is the case, the type of follow-on data set that can be created for an individual data item can be determined and corresponding type information can be included in the shopping cart list.

Upon expansion of a particular shopping cart that includes a data item allowing for a creation of a particular follow-on data set, the type information can be assessed and an appropriately captioned control element 56, as shown in FIG. 10, can be displayed. Upon activation of the control element 56 shown in FIG. 10, a control signal can be generated that initiates the automatic creation of the appropriate follow-on data set for the selective data item (i.e. either a confirmation or an invoice).

Although the present invention has been particularly described with reference to exemplary embodiments thereof, it should be readily apparent to those of ordinary skill in the art that various changes, rearrangements, modifications and substitutions are intended within the form and details thereof, without departing from the spirit and scope of the invention. Accordingly, it will be appreciated that in numerous instances some features of the invention will be employed without a corresponding use of other features. Further, those skilled in the art will understand that variations can be made in the number and arrangement of components illustrated in the above figures. It is intended that the scope of the appended claims include such changes and modifications.

What is claimed is:

1. A computer-implemented method for handling procurement-related data sets accessible from a plurality of network components, the method comprising:

providing a database with a plurality of purchase orders, each purchase order including at least one data item and associated with a shopping cart, the shopping cart comprising a header including a timestamp, and a follow-on data set table configured to store a reference to each follow-on data set related to the shopping cart;

generating a first list of data sets from the at least one data item in response to receiving a user-defined selection criteria;

displaying the purchase order and a second list of data sets, the second list of data sets comprising at least a portion of the first list of data sets, wherein each data set included in the second list of data sets is configured to generate a follow-on data set;

displaying, for a first data set included in the second list of data sets, a related first control element configured to automatically generate, in response to activation of the first control element, the first follow-on data set;

storing information relating to the first follow-on data set in the follow-on data set table, the information including a reference to the purchase order and a dependency between a first processing stage associated with the purchase order and a second processing stage associated with the first follow-on data set; and outputting the first follow-on data set to at least one of the plurality of network components.

2. The method of claim 1, further comprising defining a plurality of follow-on data set types associated with at least one procurement item, the procurement item including at least one of goods and services.

3. The method of claim 2, further comprising consecutively creating two or more follow-on data sets during a process involving consecutive processing stages, wherein each processing stage is associated with one of the plurality of follow-on data set types.

4. The method of claim 1, further comprising providing the input of the at least one user-defined criteria for generating the first list of data sets.

5. The method of claim 4, further comprising:
providing a selection of a follow-on data set type; and
generating a purchase order list from purchase orders that create a follow-on data set of a selected type.

6. The method of claim 5, wherein generating the purchase order list from purchase orders that create the follow-on data set of the selected type includes:
receiving an input by a second control element configured to generate a control signal to select and to display only data sets configured to generate a specific follow-on data set type; and
evaluating the second control signal prior to generating the list of purchase orders.

7. The method of claim 2, further comprising:
defining, for each follow-on data set type, an individual type of the first control element;
assessing the purchase orders of the list to determine the type of follow-on data set that can automatically be created for a particular purchase order; and
displaying a purchase order for which a follow-on data set of a specific type is created together with the corresponding type of first control element.

8. The method of claim 1, wherein the list also includes other purchase orders for which an associated follow-on data set are only created using a dialogue routine and wherein, for each of such other purchase orders, the first control element, when displayed, is configured as non-active.

9. The method of claim 1, further comprising relating a third control element with each displayed data set of the list of purchase orders, wherein, upon activation of the third control element, additional information about the selected data set is displayed together with the first control element.

10. The method of claim 1, wherein upon activation of the first control element by a user, at least one of the displayed purchase order and any data set associated therewith is locked from other users at least partially with respect to changing data comprised therein.

11. The method of claim 1, wherein the data required for automatically generating the follow-on data set is derived from at least one of the selected data set and any data set associated with the displayed purchase order prior to displaying the list of purchase orders.

12. The method of claim 1, further comprising:
controlling a printing device arranged in the network to generate a document from the information included in the first follow-on data set.

13. The method of claim 1, wherein the computer network includes an application server and at least one presentation server communicating with the application server according to the hypertext transfer protocol (HTTP).

14. The method of claim 1, wherein the first follow-on data set includes at least one of invoice data and delivery confirmation data.

15. A method for handling procurement-related data sets accessible from a plurality of network components, the method comprising:
providing a database with a plurality of purchase orders, each purchase order including at least one data item and associated with a shopping cart, the shopping cart comprising a header including a timestamp, and a follow-on data set table configured to store a reference to each follow-on data set related to the shopping cart;
generating a first list of data sets from the at least one data item in response to receiving a user-defined selection criteria;
displaying the purchase order and a second list of data sets, the second list of data sets comprising at least a portion of the first list of data sets, wherein each data set included in the second list of data sets is configured to generate a follow-on data set;
displaying, for a first data set included in the second list of data sets, a first control element configured to automatically generate, in response to activation of the first control element, the first follow-on data set; and
storing information relating to the first follow-on data set in the follow-on data set table, the information including a reference to the purchase order and a dependency between a first processing stage associated with the purchase and a second processing stage associated with the first follow-on data set.

16. The method of claim 15, further comprising:
defining a plurality of follow-on data set types, including at least an invoice data set type and a delivery confirmation data set type.

17. A computer program product, embodied on a computer readable medium, comprising program code portions for being executed on one or more components of a computer network, the computer program product including:
first program code for searching a database for purchase orders according to at least one user-defined selection criteria, and for generating a purchase order list thereof, each purchase order including at least one data item and associated with a shopping cart, the shopping cart comprising a header including a timestamp, and a follow-on data set table configured to store a reference to each follow-on data set related to the shopping cart;
second program code for displaying the purchase order list at least partially, wherein, for a displayed purchase order of the list, a related first control element is displayed that automatically creates a first follow-on data set, the related first control element being configured for activation by a user-operated input device that generates a first control signal for initiating the automatic creation of the first follow-on data set for the displayed purchase order; and
third program code, responsive to generation of the first control signal, for skipping an implemented dialogue routine for the first follow-on data set to be created, for automatically creating the first follow-on data set based on data derived from at least one of the displayed purchase order and any data set associated with the displayed purchase order, and for associating the first follow-on data set with the displayed purchase order, wherein associating the first follow-on data set with the displayed purchase order includes writing information relating to the first follow-on data set in the follow-on data set table, the information including a reference to the displayed purchase order and a dependency between a first processing stage associated with the displayed purchase order and a second processing stage associated with the first follow-on data set.

18. A computer program product, embodied on a computer readable medium, comprising program code portions for being executed on one or more components of a computer network, the program code portions controlling the one or more components to handle procurement-related purchase orders in a computer, the computer code product comprising:
first program code to provide a database with a plurality of purchase orders, each purchase order including at least one data item and associated with a shopping cart, the shopping cart comprising a header including a timestamp, and a follow-on data set table configured to store a reference to each follow-on data set related to the shopping cart;
second program code to generate a list of purchase orders from the database according to at least one user-defined selection criteria;
third program code to at least partially display the list, wherein, for a displayed purchase order of the list a related first control element is displayed that automatically creates a first follow-on data set, the first control element being configured for activation by a user-operated input device that generates a first control signal for automatically creating the first follow-on data set for the displayed purchase order; and
fourth program code to skip an implemented dialogue routine for the first follow-on data set to be created upon generation of the first control signal, and to automatically create the first follow-on data set based on data automatically derived from at least one of the displayed purchase order and any data set associated with the displayed purchase order, and to associate in the database the first follow-on data set with the displayed purchase order, wherein associating the first follow-on data set with the displayed purchase order includes writing information relating to the first follow-on data set in the follow-on data set table, the information including a reference to the displayed purchase order and a dependency between a first processing stage associated with the displayed purchase order and a second processing stage associated with the first follow-on data set displayed.

19. A network component of a computer network, the network component comprising:
   a processor for executing an instruction for searching at least one database for purchase orders according to at least one user-defined criteria, each of the purchase orders including at least one data item and associated with a shopping cart, the shopping cart comprising a header including a timestamp, and a follow-on data set table configured to store a reference to each follow-on data set related to the shopping cart, and for generating a list thereof, wherein, for a displayed purchase order of the list, a related first control element is provided that automatically creates a first follow-on data set, the related first control element being configured for activation by a user-operated input device for initiating the automatic creation of the first follow-on data set for the displayed purchase order;
   wherein, upon activation of the control element, the executed instruction skips a dialogue routine for the first follow-on data set to be created, for automatically creating the first follow-on data set based on data automatically derived from at least one of the displayed purchase order and any data set associated with the displayed purchase order, and for associating the displayed purchase order with the first follow-on data set, wherein associating the first follow-on data set with the displayed purchase order includes writing information relating to the first follow-on data set in the follow-on data set table, the information including a reference to the displayed purchase order and a dependency between a first processing stage associated with the displayed purchase order and a second processing stage associated with the first follow-on data set.

20. The network component of claim 19, further comprising: a first interface to the at least one database and a second interface to a display device.

21. A method for handling data sets in a computer network, the method comprising:
   generating a list of purchase orders according to at least one user-defined criteria, each purchase order including at least one data item and associated with a shopping cart, the shopping cart comprising a header including a timestamp, at and a follow-on data set table configured to store a reference to each follow-on data set related to the shopping cart;
   displaying the list at least partially, wherein, for a displayed purchase order of the list a related first control element is displayed that enables the automatic creation of a first follow-on data set; and
   skipping a dialogue routine for the first follow-on data set to be created upon activation of the first control element, to automatically create the first follow-on data set based on data automatically derived from at least one of the displayed purchase order and any data set associated with the displayed purchase order and to associate the first follow-on data set with the displayed purchase order, wherein associating the first follow-on data set with the displayed purchase order includes writing information relating to the first follow-on data set in the follow-on data set table, the information including a reference to the displayed purchase order and a dependency between a first processing stage associated with the displayed purchase order and a second processing stage associated with the first follow-on data set.

22. A method for handling procurement-related data sets in a computer network by automatically creating, for a data set, at least one associated follow-on data set, the method comprising:
   providing a database with a plurality of purchase orders, each purchase order including at least one data item and associated with a shopping cart, the shopping cart comprising a header including a timestamp, and a follow-on data set table configured to store a reference to each follow-on data set related to the shopping cart;
   generating a list of purchase orders from the database according to at least one user-defined criteria;
   displaying the list at least partially, wherein, for a displayed purchase order of the list, a related first control element is displayed that enables the automatic creation of a first follow-on data set, the related first control element being configured for activation by a user operated input device to generate a first control signal for initiating the automatic creation of the first follow-on data set for the displayed purchase order; and
   skipping a dialogue routine for the follow-on data set to be created upon generation of the first control signal, automatically creating the first follow-on data set based on data automatically derived from at least one of the displayed purchase order and any data set associated with the displayed purchase order and to associate in the database the first follow-on data set with the displayed purchase order, wherein associating the first follow-on data set with the displayed purchase order includes writing information relating to the first follow-on data set in the follow-on data set table, the information including a reference to the displayed purchase order and a dependency between a first processing stage associated with the displayed purchase order and a second processing stage associated with the first follow-on data set.

23. An apparatus of a computer network, the apparatus comprising:
   processing means for generating an instruction for searching a database for purchase orders according to at least one user-defined criteria, the purchase orders including at least one data item and associated with a shopping cart, the shopping cart comprising a header including a timestamp, and a follow-on data set table configured to store a reference to each follow-on data set related to the shopping cart, and for generating a list thereof for presentation on a display, wherein, for a displayed purchase order of the list a related first control element is provided that enables the automatic creation of a first follow-on data set, the first control element being configured for activation by a user-operated input device to initiate the automatic creation of the first follow-on data set for the displayed purchase order;
   wherein the processing means, upon activation of the first control element, skips a dialogue routine for the first follow-on data set to be created, automatically creating the first follow-on data set based on data automatically derived from at least one of the displayed purchase order and any data set associated with the displayed purchase order and associating the displayed purchase order with the first follow-on data set, wherein associating the first follow-on data set with the displayed purchase order includes writing information relating to the first follow-on data set in the follow-on data set table, the information including a reference to the displayed purchase order and a dependency between a first processing stage associated with the displayed purchase order and a second processing stage associated with the first follow-on data set.

24. A system comprising a computer processor and a memory coupled to the processor, where the memory is encoded with one or more programs that perform a method for handling procurement-related data sets in a computer network, the method comprising:
   providing a database with a plurality of purchase orders, each purchase order including at least one data item and associated with a shopping cart, the shopping cart comprising a header including a timestamp, and a follow-on data set table configured to store a reference to each follow-on data set related to the shopping cart;
   generating a list of purchase orders according to at least one user-defined selection criteria
   displaying the list at least partially, wherein, for a displayed purchase order of the list, a related first control element is displayed that enables the automatic creation of a first follow-on data set;
   skipping a dialogue routine for the first follow-on data set to be created upon activation of the control element, to automatically create the first follow-on data set based on data automatically derived from at least one of the displayed purchase order and any data set associated with the displayed purchase order; and
   associating the first follow-on data set with the displayed purchase order, wherein associating the first follow-on data set with the displayed purchase order includes writing information relating to the first follow-on data set in the follow-on data set table, the information including a reference to the displayed purchase order and a dependency between a first processing stage associated with the displayed purchase order and a second processing stage associated with the first follow-on data set.

25. A system comprising a computer processor and a memory coupled to the processor, where the memory is encoded with one or more programs that perform a method for handling procurement-related data sets in a computer network, the method comprising:
   providing a database with a plurality of purchase orders, each purchase order including at least one data item and associated with a shopping cart, the shopping cart comprising a header including a timestamp, and a follow-on data set table configured to store a reference to each follow-on data set related to the shopping cart;
   generating a list of purchase orders from the database according to at least one user-defined selection criteria;
   displaying the list at least partially, wherein, for a displayed purchase order of the list, a first control element is displayed that enables the automatic creation of a first follow-on data set, the first control element being configured for activation by a user-operated input device to generate a first control signal for initiating the automatic creation of the first follow-on data set for the displayed purchase order;
   skipping a dialogue routine for the follow-on data set to be created upon generation of the first control signal, automatically creating the first follow-on data set based on data automatically derived from at least one of the displayed purchase order and any data set associated with the displayed purchase order; and
   associating in a database the first follow-on data set with the displayed purchase order, wherein associating the first follow-on data set with the displayed purchase order includes writing information relating to the first follow-on data set in the follow-on data set table, the information including a reference to the displayed purchase order and a dependency between a first processing stage associated with the displayed purchase order and a second processing stage associated with the first follow-on data set.

26. The method of claim 1, wherein the user-defined selection criteria comprises:
   at least one attribute of the purchase order stored in the header, and
   a data set type, wherein the data set type includes a purchase order that generates follow-on data sets.

27. The method of claim 26, wherein the first control element is displayed based on a selection of at least one purchase order according to the user-defined selection criteria.

28. The method of claim 1, wherein the first follow-on data set is derived by evaluating a data set history associated with the purchase order.

29. The method of 28, wherein evaluating the data set history includes comparing an initially ordered quantity specified in the purchase order with a quantity that has already been invoiced, wherein the follow-on data set includes a quantity that is based on the comparison.

* * * * *